United States Patent
Kitamura et al.

(10) Patent No.: US 6,933,664 B2
(45) Date of Patent: Aug. 23, 2005

(54) ELECTRON EMITTING DEVICE, ELECTRON SOURCE, AND IMAGE FORMING APPARATUS

(75) Inventors: Shin Kitamura, Kanagawa (JP); Yoshiyuki Osada, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/464,760

(22) Filed: Jun. 19, 2003

(65) Prior Publication Data

US 2003/0209992 A1 Nov. 13, 2003

Related U.S. Application Data

(62) Division of application No. 09/865,698, filed on May 29, 2001, now Pat. No. 6,624,589.

(30) Foreign Application Priority Data

| May 30, 2000 | (JP) | ............................. 2000-161001 |
| May 30, 2000 | (JP) | ............................. 2000-161002 |
| May 18, 2001 | (JP) | ............................. 2001-149455 |

(51) Int. Cl.$^7$ ............................................. H01J 1/02
(52) U.S. Cl. ........................ 313/309; 313/491; 257/10
(58) Field of Search ......................... 313/309, 310, 313/336, 351, 495–497, 311, 407, 491; 257/10; 315/169.3, 169.4

(56) References Cited

U.S. PATENT DOCUMENTS

| 4,728,851 | A | 3/1988 | Lambe ..................... 313/309 |
| 4,904,895 | A | 2/1990 | Tsukamoto et al. ......... 313/336 |
| 4,956,578 | A | 9/1990 | Shimizu et al. ............... 315/3 |
| 5,185,554 | A | 2/1993 | Nomura et al. ............ 313/495 |
| 5,192,240 | A | 3/1993 | Komatsu ..................... 445/24 |
| 5,214,346 | A | 5/1993 | Komatsu ................... 313/309 |
| 5,382,867 | A | 1/1995 | Yuji et al. ................. 313/309 |

(Continued)

FOREIGN PATENT DOCUMENTS

| EP | C 0 290 026 | 11/1988 |
| EP | 0 290 026 | 11/1988 |
| EP | 0 394 698 A2 | 10/1990 |
| EP | 0 443 865 | 8/1991 |
| EP | 0 535 953 A3 | 4/1993 |
| EP | 0 535 953 | 4/1993 |
| EP | 0 535 953 A2 | 4/1993 |
| EP | 0 716 439 | 6/1996 |
| EP | 0 758 028 A2 | 2/1997 |
| EP | 0 614 209 A1 | 9/1997 |
| EP | 0 797 233 A2 | 9/1997 |
| EP | 0 871 195 | 10/1998 |
| EP | 9 913 508 | 5/1999 |
| EP | 0 936 650 | 8/1999 |
| EP | 0 980 089 A1 | 2/2000 |
| EP | 0 986 084 A2 | 3/2000 |
| EP | 1 117 118 A1 | 7/2001 |
| EP | C 1 122 344 A2 | 8/2001 |
| EP | 1 122 344 A3 | 8/2001 |
| EP | 1 113 478 A1 | 7/2002 |
| JP | 2-112125 | 4/1990 |

(Continued)

OTHER PUBLICATIONS

W.P. Dyke et al., "Field Emission", *Advances in Electronics and Electron Physics*, vol. 8, (1956) pp. 89–185.

(Continued)

Primary Examiner—Wilson Lee
(74) Attorney, Agent, or Firm—Fitzpatrick, Cella, Harper & Scinto

(57) ABSTRACT

An electron emitting device includes a first electrode located on a substrate, an insulating layer located on the first electrode, and a second electrode located on the insulating layer. The second electrode has a first surface and a second surface, which are substantially vertical to a direction that the first electrode and the insulating layer are laminated. The first surface of the second electrode is in contact with the insulating layer. A higher potential than that applied to the second electrode is applied to the first electrode to emit an electron from the second surface.

11 Claims, 32 Drawing Sheets

U.S. PATENT DOCUMENTS

| | | | |
|---|---|---|---|
| 5,577,943 A | 11/1996 | Vickers et al. | 445/24 |
| 5,612,587 A | 3/1997 | Itoh et al. | 313/309 |
| 5,773,921 A | 6/1998 | Keesmann et al. | 313/309 |
| 5,872,422 A | 2/1999 | Xu et al. | 313/311 |
| 5,935,639 A | 8/1999 | Sullivan et al. | 427/78 |
| 5,973,444 A | 10/1999 | Xu et al. | 313/309 |
| 5,982,091 A | 11/1999 | Konishi | 313/495 |
| 5,986,389 A | 11/1999 | Tsukamoto | 313/310 |
| 6,087,765 A | 7/2000 | Coll et al. | 313/309 |
| 6,135,839 A | 10/2000 | Iwase et al. | 445/24 |
| 6,147,449 A | 11/2000 | Iwasaki et al. | 313/495 |
| 6,171,162 B1 | 1/2001 | Iwasaki et al. | 445/6 |
| 6,184,610 B1 | 2/2001 | Shibata et al. | 313/309 |
| 6,204,597 B1 | 3/2001 | Xie et al. | 313/310 |
| 6,231,413 B1 | 5/2001 | Tsukamoto | 445/24 |
| 6,246,168 B1 | 6/2001 | Kishi et al. | 313/495 |
| 6,288,494 B1 | 9/2001 | Tsukamoto et al. | 315/169.1 |
| 6,313,572 B1 | 11/2001 | Yamada | 313/310 |
| 6,420,726 B2 | 7/2002 | Choi et al. | 257/10 |
| 6,448,709 B1 * | 9/2002 | Chuang et al. | 313/497 |
| 6,472,802 B1 * | 10/2002 | Choi et al. | 313/309 |
| 6,472,814 B1 | 10/2002 | Yamanobe et al. | 313/495 |
| 6,538,367 B1 * | 3/2003 | Choi et al. | 313/309 |
| 2002/0006232 A1 | 1/2002 | Choi et al. | |
| 2002/0009637 A1 | 1/2002 | Murakami et al. | 429/213 |
| 2002/0136896 A1 | 9/2002 | Takikawa et al. | 428/408 |

FOREIGN PATENT DOCUMENTS

| | | |
|---|---|---|
| JP | 3-20941 | 1/1991 |
| JP | 3-295131 | 12/1991 |
| JP | 4-212236 | 8/1992 |
| JP | 5-159696 | 6/1993 |
| JP | 5-198253 | 8/1993 |
| JP | 5-211029 | 8/1993 |
| JP | 5-274997 | 10/1993 |
| JP | 7-6714 | 1/1995 |
| JP | 8-115652 | 5/1996 |
| JP | 8-264109 | 10/1996 |
| JP | 9-82214 | 3/1997 |
| JP | 9-188600 | 7/1997 |
| JP | 10-289650 | 10/1998 |
| JP | 11-232997 | 8/1999 |
| JP | 2000/277003 | 10/2000 |
| WO | WO 89/07163 | 8/1989 |
| WO | WO 90/07023 | 6/1990 |
| WO | WO 98/05920 | 2/1998 |
| WO | C WO 01/93292 A1 | 12/2001 |

OTHER PUBLICATIONS

C.A. Spindt et al., "Physical Properties of Thin–film Field Emission Cathodes with Molybdenum Cones", *Journal of Applied Physics*, vol. 47, No. 12 (1976), pp. 5248–5263.

C.A. Mead, "Operation of Tunnel–Emission Devices", *Journal of Applied Physics*, vol. 32, No. 4, (1961), pp. 646–652.

Toshiaki Kusunoki et al., "Fluctuation–Free Electron Emission from Non–Formed Metal–Insulator–Metal (MIM) Cathodes Fabricated by Low Current Anodic Oxidation", *Japanese Journal of Applied Physics*, vol. 32 No. 11B, (1993), p. L1695–1697.

M.I. Elinson et al., "The Emission of Hot Electrons and the Field Emission of Electrons from Tin Oxide", *Radio Engineering and Electronic Physics*, (1965) pp. 1290–1296.

G. Dittmer, "Electrical Conduction and Electron Emission of Discontinuous Thin Films", *Thin Solid Films*, vol. 9, (1972) pp. 317–329.

M. Hartwell et al., "Strong Electron Emission from Patterned Tin–Indium Oxide Thin Films", IEEE Trans. Ed. Conf., (1983) pp. 519–521.

Hisashi Araki et al., Electroforming and Electron Emission of Carbon Thin Films, Journal of the Vacuum Society of Japan, 1983 (with English Abstract on p. 22).

R.T.K. Baker et al., "Formation of Carbonaceous Deposits from the Platinum–Iron Catalyzed Decomposition of Acyetylene," 37 J. Catal. 101–105 (1975).

R.T.K. Baker, "Catalytic Growth of Carbon Filaments," 27 (3) Carbon 315–323 (1989).

S. Iijima, "Helical Microtubules of Graphitic Carbon," Nature, vol. 354, 56–58 (1991).

T. W. Ebbesen et al., " Large–Scale Synthesis of Carbon Nanotubes," Nature, vol. 358, 220–222 (1992).

W. A. DeHeer et al., "Aligned Carbon Nanotube Films: Production and Optical and Electronic Properties," Science vol. 268, 845–847 (1995).

T. Guo et al., " Catalytic Growth of Single–Walled Nanotubes by Laser Vaporization," Chem Phys. Lett., vol. 243, 49–54 (1995).

A. G. Rinzler et al., "Unraveling Nanotubes: Field Emission from an Atomic Wire," Sci nce, vol. 269, 1550–1553 (1995).

W. A. DeHeer et al., "A Carbon Nanotube Field–Emission Electron Source," Science, vol. 270, 1179–1180 (1995).

T. Kyotani et al., "Preparation of Ultrafine Carbon Tubes in Nanochannels of an Anodic Aluminum Oxide Film," Chem. Mater., vol. 8, 2109–2113 (1996).

A. Thess et al., "Crystalline Ropes of Metallic Carbon Nanotubes," Science, vol. 273 483–487 (1996).

H. Dai et al., " Single–Wall Nanotubes Produced by Metal–Catalyzed Disproportionati n f Carbon Monoxide," Chem. Phys. Lett., vol. 260, 471–475 (1996).

H. Dai et al., "Nanotubes as Nanoprobes in Scanning Probe Microscopy," Nature, vol. 384, 147–150 (1996).

A. C. Dillon et al., "Storage of Hydrogen in Single–Walled Carbon Nanotubes," Nature, vol. 386, 377–379 (1997).

Rodriguez et al. "Catalytic Engineering of Carbon Nanostructures," Langmuir 11, 3862–3866 (1995).

* cited by examiner

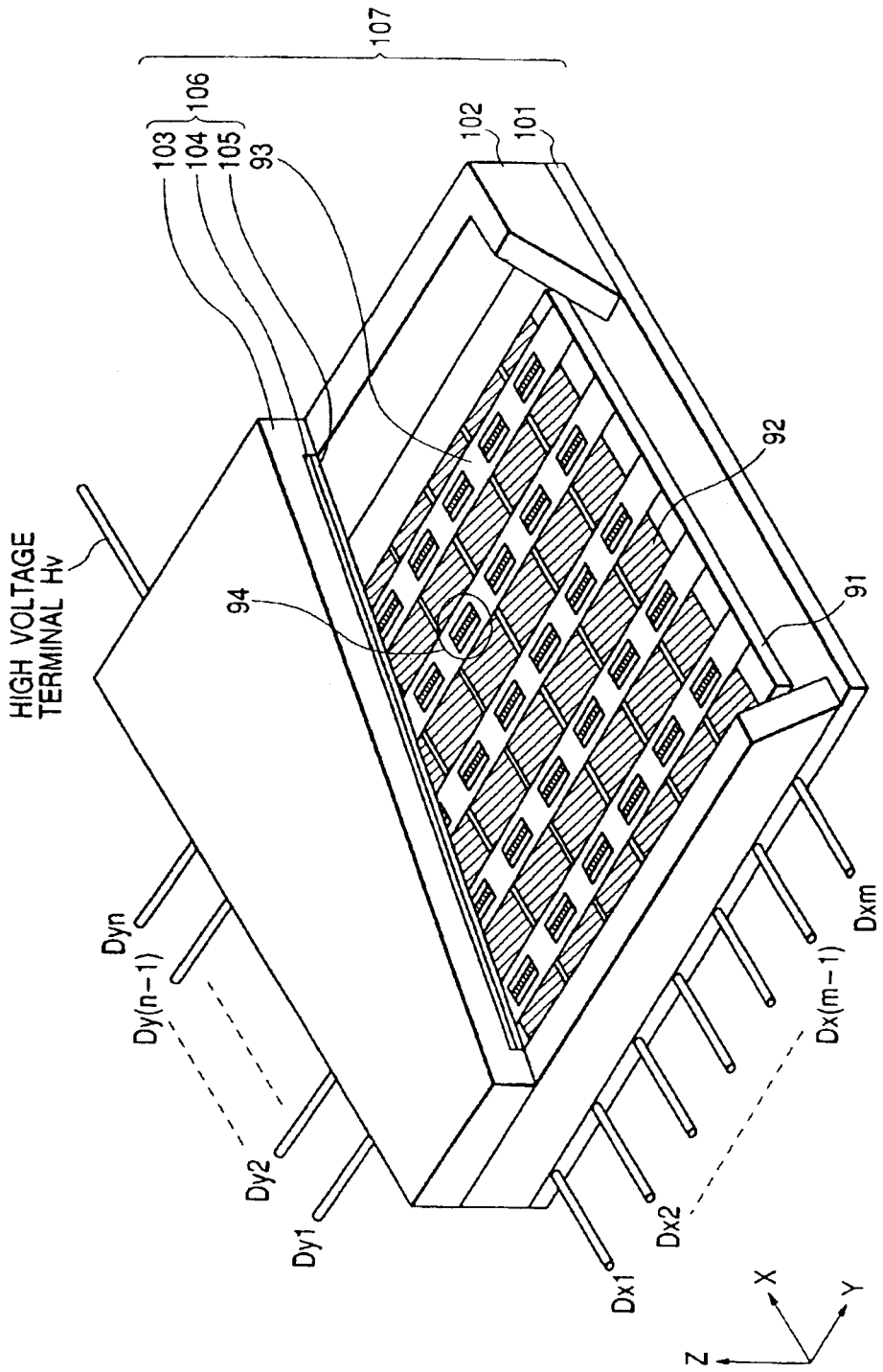

PRIOR ART

ELECTRON EMITTING DEVICE, ELECTRON SOURCE, AND IMAGE FORMING APPARATUS

This application is a division of application Ser. No. 09/865,698, filed May 29, 2001 now U.S. Pat. No. 6,624,589.

BACKGROUND OF THE INVENTION

1. Field of the Invention

The present invention relates to an electron emitting device, an electron source, and an image forming apparatus.

2. Related Background Art

Conventionally, two types of electron sources (cathodes), that is, a thermionic and a cold cathode have been known as the electron emitting device. As the cold cathode, there are a field emission type (hereinafter referred to as an FE type) electron emitting device, a metal/insulating-layer/metal type (hereinafter referred to as an MIM type) electron emitting device, a surface conduction type electron emitting device, or the like.

As examples of the FE type, those disclosed in W. P. Dyke & W. W. Dolan, "Field Emission", Advance in Electron Physics, 8, 89 (1956), C. A. Spindt, "Physical Properties of thin-film field emission cathodes with molybdenum cones", J. Appl. Phys., 47, 5248 (1976), and the like have been known.

As examples of the MIM type, the one as disclosed in C. A. Mead, "Operation of Tunnel-Emission Devices", J. Appl. Phys., 32, 646 (1961), and the like have been known.

Also, as recent examples, Toshiaki Kusunoki, "Fluctuation-free electron emission from non-formed metal-insulator-metal (MIM) cathodes fabricated by low current anodic oxidation", Jpn. J. Appl. Phys. Vol. 32 (1993) pp. L1695, Mutsumi Suzuki, et.al, "An MIM-cathode array for cathode luminescent displays", IDW'96, (1996) pp. 529, and the like have been studied.

As examples of the surface conduction type, there are the ones as described in Elinson's report (M. I. Elinson, Radio Eng. Electron Phys., 10 (1965)), and the like. This surface conduction type electron emitting device is realized by utilizing the phenomenon that electrons are emitted out of a small area thin film formed on a substrate when a current is made to flow in parallel with the film surface. As the surface conduction type electron emitting device, the device using an $SnO_2$ thin film described in the above Elinson's report, a device using an Au thin film (G. Dittmer. Thin Solid Films, 9, 317 (1972)), a device using an $In_2O_3/SnO_2$ thin film (M. Hartwell and C. G. Fonstad: IEEE Trans. ED Conf., 519 (1983)), and the like, have been reported.

SUMMARY OF THE INVENTION

When the electron emitting device is applied to the image forming apparatus (in particular, the display), it is necessary to obtain an emitting current for causing a phosphor to emit light with a sufficient intensity. Also, for high minuteness of the display, it is desired that a diameter of an electron beam to be irradiated into the phosphor is small. Also, it is important to make the manufacturing easy.

As an example of a conventional FE type, a so-called "spindt type" electron emitting device is shown in FIG. 29. In FIG. 29, reference numeral 1 denotes a substrate, 4 denotes a cathode electrode layer (lower potential electrode), 3 denotes an insulating layer, 2 denotes a gate electrode layer (higher potential electrode), 5 denotes a microchip, and 6 denotes an equipotential surface. When a bias is applied between the microchip 5 having a curvature "r" and the gate electrode layer 2, electrons are emitted from the end of the microchip 5 toward an anode. An amount of emitting electron is determined by the distance "d" between the gate electrode layer 2 and the end of the microchip 5, a voltage Vg between the gate electrode and the microchip, a work function of an emitting region material (microchip), and the like. Namely, that the device is manufactured by controlling the distance "d" between the gate electrode layer 2 and the microchip 5 is a factor for determining the performance of the device.

A general manufacturing process of the Spindt type electron emitting device is shown in FIGS. 30A to 30D. The manufacturing process will be described through those drawings. First, the cathode electrode layer 4 made of Nb or the like, the insulating layer 3 made of $SiO_2$ or the like, and the gate electrode layer 2 made of Nb or the like are laminated in this order on the substrate 1 made of glass or the like. Then, a circular minute hole which penetrates the gate electrode layer 2 and the insulating layer 3 is formed by a reactive ion etching method (FIG. 30A).

After that, a sacrificial layer 7 made of aluminum or the like is formed on the gate electrode layer 2 by oblique evaporation or the like (FIG. 30B).

A microchip material 8 such as molybdenum is deposited in the structure formed thus by a vacuum evaporation method. Here, the minute hole is filled with the deposition on the sacrificial layer by the progress of deposition. Thus, the microchip 5 is conically formed in the minute hole (FIG. 30C).

Finally, the sacrificial layer 7 is dissolved to lift off the microchip material 8. Thus, the device is completed (FIG. 30D).

However, in such a manufacturing method, it is difficult to control the distance "d" with high repeatability. Thus, there is the case where a variation in an amount of emitting current between devices is produced by a variation in the distance "d". Also, if the device is driven with the state that a short circuit occurs between the microchip 5 and the gate electrode layer 2 through a piece of metal or the like which is produced by the lift off, there is the case where heat is generated in the shirt circuit region and thus a discharge breakdown occurs in the shirt circuit region and its surrounding. In this case, an effective electron emitting region is decreased. Thus, in an image forming apparatus (in particular, a display) using a plurality of devices having the above variation in an amount of emitting electrons, an unevenness of brightness occurs. Thus, the apparatus becomes a low performance as the display.

Further, in the Spindt type device, electrons are emitted from an extremely narrow region. Thus, when an emitting current density is increased in order to cause the phosphor to emit light, there is the case where a thermal breakdown of the electron emitting region (microchip) is induced, and thus the life of the device is limited. Also, these is the case where the end of the microchip is intensively sputtered with ions present in a vacuum, and thus the life of the device is shortened.

Note that electrons emitted to the vacuum are carried along the direction orthogonal to an equipotential surface. However, in the structure as shown in FIG. 29, the equipotential surface 6 is formed in the hole along the outer shape of the microchip 5. Thus, the electrons emitted from the end of the microchip 5 tend to spread. Since a portion of the emitted electrons is absorbed into the gate electrode layer 2, an amount of electrons which reach the anode is decreased. When the distance "d" is shortened, an amount of electrons absorbed in the gate electrode layer 2 tends to increase.

In order to overcome such faults, various examples have been proposed.

As an example for preventing the diffusion of an electron beam, there is one that a focusing electrode 9 is located over the electron emitting region. FIG. 31 is a structure view of an FE type device with the focusing electrode. In this example, the emitted electron beam is focused with the potential of the focusing electrode 9. However, this example requires a further complicated process than the above manufacturing process, and thus increase in a manufacturing cost occurs.

As an example for reducing the diameter of an electron beam without locating the focusing electrode, there is the one described in Japanese Patent Application Laid-Open No. 8-264109. This structure is shown in FIG. 32. In this example, in order to emit electrons from a thin film 10 located in a hole, since a flat equipotential surface 6a is formed on an electron emitting surface, the diffusion of the electron beam becomes small. However, in this example, since the electron emitting region is present in the hole and the gate electrode layer 2 is located over the electron emitting surface as conventionally, a potential distribution 6b correlated with the depth of the hole and a gate electrode interlayer distance is formed in the vicinity of the hole. Therefore, although not to the extent of the spindt type, the emitted electrons tend to spread and thus the problem in that a portion of the emitted electrons is absorbed into the gate electrode layer 2 is not solved.

As an example for improving an electron emitting efficiency, there are those described in Japanese Patent Application Laid-Open No. 10-289650, U.S. Pat. No. 6,135, 839 and the like. The structure is shown in FIG. 33. A positive potential (voltage) is applied to a gate electrode layer 2 and a second gate electrode layer 11 with reference to a cathode electrode layer 4 (where 0<|Vg1|≦|Vg2|) and thus an amount of electron emitted from the cathode electrode layer 4 is increased. However, even in this example, the emitted electrons tend to spread.

Similarly, as an example for improving the electron emitting efficiency, there is a report that a needle shaped electrode is located in a minute hole formed by Al anodic oxidation, and thus a density in a cathode electrode and an amount of emitting electron per unit area are increased (Japanese Patent Application Laid-Open No. 5-211029).

However, even in this example, the emitted electrons tend to spread. Thus, a complicated manufacturing method is required such that the cathode electrode is located in the minute hole.

On the other hand, as shown in FIG. 34, the MIM type has the structure in that an insulating layer 3 is located between a lower electrode (cathode electrode layer) 4 and an upper electrode (gate electrode layer) 2, and a voltage is applied between both electrodes 4 and 2 to lead the electrons. In this structure, since the direction of an internal electric field coincides with that of emitting electrons, and a potential distribution on an emitting surface is not disturbed, a small diameter of an electron beam can be realized. However, since scattering of electrons is produced in the insulating layer 3 and the upper electrode 2, the efficiency is generally low.

An example of the conventional surface conduction type electron emitting device is shown in FIG. 35 (although the electron emitting devices until here are shown with the cross sectional views, this example is shown with a plane view). In FIG. 35, reference numeral 1 denotes a substrate, 4 denotes a device cathode (cathode electrode layer), 2 denotes a device anode (gate electrode layer), 23 denotes electroconductive film, and 24 denotes an electron emitting region. Even in the surface conduction type electron emitting device, generally, a relationship between the electron emitting efficiency and the diameter of the electron beam is a trade-off. As respective solving methods, there are the proposal with respect to high efficiency (Japanese Patent Application Laid-Open No. 9-82214), the proposal with respect to the convergence of electron beam (Japanese Patent Application Laid-Open No. 2-112125), and the like.

An example that the electron emitting device is applied as an image forming apparatus is shown in FIG. 36. In this example, lines of gate electrodes layers 2 and lines of cathode electrode layers 4 are arranged in a matrix, electron emitting devices 14 are arranged in cross sectional portions of both lines. In response to an information signal, electrons are emitted from the electron emitting device 14 located in the selected cross sectional portion, and accelerated by the voltage of an anode 12. Thus, the electrons are incident to the phosphors 13. This is a so-called triode type device.

Also, as shown in FIG. 37, there is a tetrode type structure in that modulation electrodes 15 (referred to as grids) is added between electron emitting deices 14 and an anode 12, and a voltage corresponding to an information signal is applied to these electrodes to control an electron flow from the electron emitting device 14.

As the tetrode type, in order to improve the alignment and the arrangement of the modulation electrode 15 with the electron emitting devices 14, there is a proposal that, as shown in FIGS. 38 and 39 (FIG. 39 is a cross sectional view along a line 39—39 in FIG. 38), modulation electrodes 15 are arranged in a rear side against electron emitting devices 14 through an insulating layer 3 (for example, Japanese Patent Application Laid-Open No. 3-20941).

In the case where the above electron emitting device is applied to an image forming apparatus such as a display, it is required that,
(1) a diameter of the electron beam is small,
(2) an electron emitting area is large,
(3) electrons can be emitted with a low voltage and high efficiency, and
(4) a manufacturing process is easy.

However, it is difficult to simultaneously satisfy these requirements in a conventional electron emitting device.

The present invention is made to solve the above problems, and therefore an object of the present invention is to provide an electric field emitting type electron emitting device, an electron source, an image forming apparatus, and the electron emitting apparatus, in which the diameter of the electron beam is small, the electron emitting area is large, the electron emitting can be made with a low voltage and high efficiency, and the manufacturing process is easy.

To achieve the above object, an electron emitting device of the present invention is characterized by comprising: a first electrode located on a substrate; an insulating layer located on the first electrode; and a second electrode located on the insulating layer, whereby the second electrode has a first surface and a second surface, which are substantially vertical to a direction that the first electrode and the insulating layer are laminated, the first surface of the second electrode is in contact with the insulating layer, and a higher potential than that applied to the second electrode is applied to the first electrode to emit an electron from the second surface.

Also, to achieve the above object, an electron emitting device of the present invention is characterized by comprising: a first electrode located on a substrate; an insulating layer located on the first electrode; and a second electrode located on the insulating layer, whereby the second electrode has a first surface in contact with the insulating layer and a second surface opposite to the first surface, and a higher potential than that applied to the second electrode is applied to the first electrode to emit an electron from the second surface.

Therefore, when the anode is located opposite to the electron emitting device of the present invention and thus the electron emitting apparatus or the image forming apparatus is manufactured, the equipotential surface between the electron emitting device and the anode is substantially parallel to the anode surface and a uniform potential distribution is formed. Thus, electrons emitted to a vacuum are moved toward the anode, and the diffusion of the electron beam can be suppressed. As a result, the diameter of the electron beam can be made small.

Also, the electron emitting area corresponds to the surface of the cathode electrode to which a low potential is applied in the anode side. Thus, since the electron emission area is wide, the durability to the bombardment of ions present in a vacuum is high.

Further, obstacles which prevent the trajectory of electrons toward the anode and a potential that produces obstacles, are not present. Thus, since almost all the emitting electrons become an emission current, the electron emission can be made with a low voltage and high efficiency.

Then, a very simple structure in that the gate electrode (to which a high potential is applied), the insulating layer, and the cathode electrode (to which a low potential is applied) are laminated on the substrate in this order, is obtained, and the manufacturing process is easy.

Thus, according to a field emission type electron emitting device with a characteristic of the present invention, since the diameter of the electron beam is small, the electron emission area is large, the electron emission can be made with a low voltage and high efficiency, and the manufacturing process is easy, such a device can be applied to the image forming apparatus such as a display.

Therefore, the electron emitting apparatus, the electron source, and the image forming apparatus, to which the electron emitting device of the present invention is applied, can be realized with a high performance.

BRIEF DESCRIPTION OF THE DRAWINGS

FIG. 10 is a schematic structure view representing an image forming apparatus using the electron source with the passive matrix arrangement according to the present invention;

DETAILED DESCRIPTION OF THE PREFERRED EMBODIMENTS

One example of an embodiment of an electron emitting device of the present invention will be described below with reference to the drawings. Note that, a range of the present invention is not limited to a size, a quality, a shape, a relative arrangement, and the like of constitution parts described in this embodiment in the case where, in particular, no specified description is made.

An electron emitting device of the present invention has a structure in that a gate electrode, an insulating layer, and a cathode electrode are laminated on a substrate in order. Also, in an electron emitting apparatus or an image forming apparatus using the electron emitting device of the present invention, an anode electrode (or an image forming member located on the anode electrode) which is opposite to a substrate in which the device of the present invention is located at an interval from the substrate, is irradiated with electrons emitted from the device.

Figure 1:
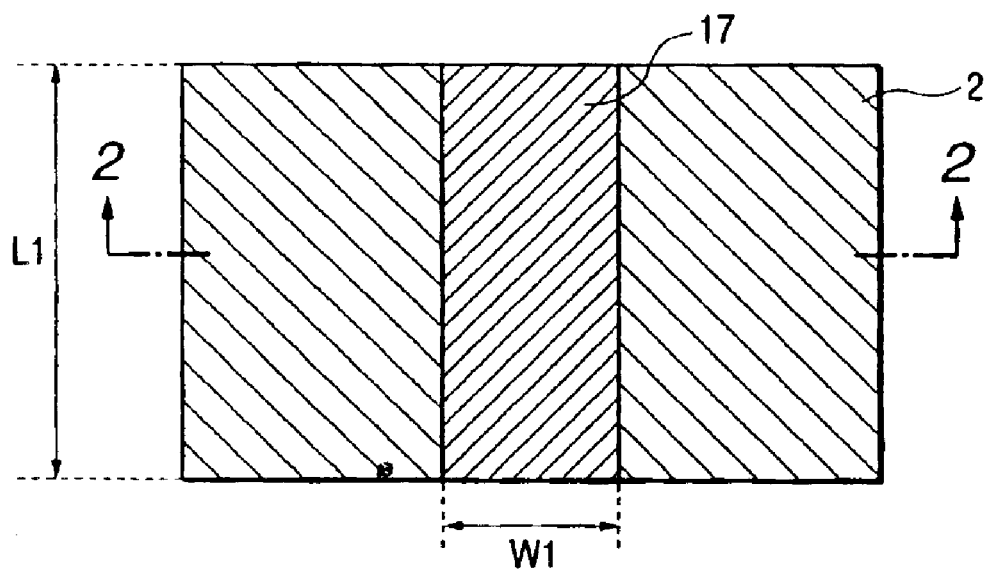
FIG. 1 is a plane view representing a structure of an electron emitting device according to the present invention.
Figure 2:
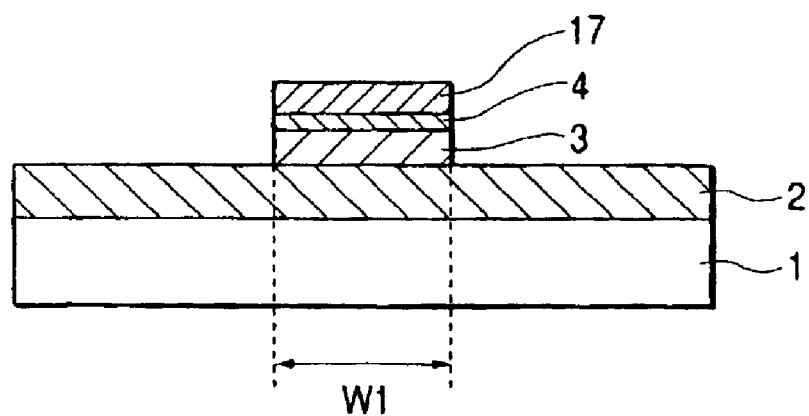
FIG. 2 is a cross sectional view along line 2—2 in FIG. 1, representing the structure of the electron emitting device according to the present invention.

FIG. 1 is a planar schematic view representing an electron emitting device of the most basic structure of the present invention, and FIG. 2 is a cross sectional view along a line 2—2 of FIG. 1. Also, FIG. 3 is a schematic view representing, in the case where this device is used in the electron emitting apparatus or the image forming apparatus, a state that the apparatus is driven (a state that electrons are emitted).

Figure 3:
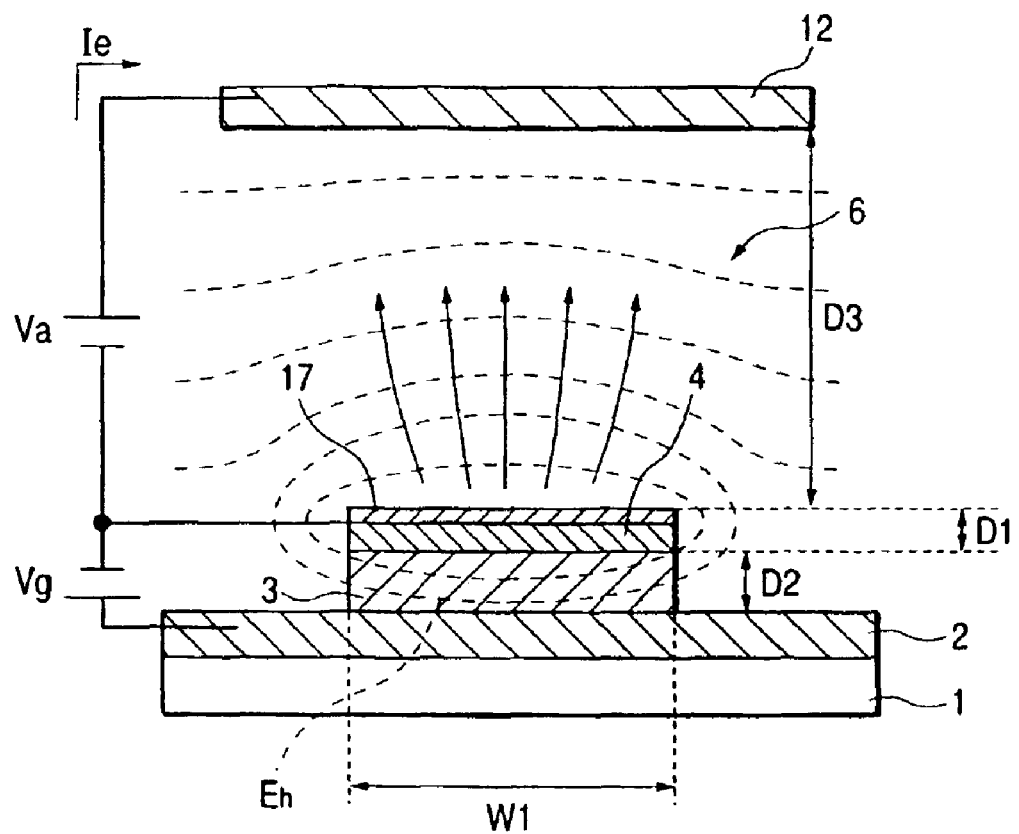
FIG. 3 shows a state that the electron emitting device according to the present invention is driven.

In FIGS. 1, 2, and 3, reference numeral 1 denotes a substrate, 2 denotes a gate electrode (first electrode) to which a high potential is applied at driving (electron emitting), 3 denotes an insulating layer, 4 denotes a cathode electrode (second electrode) to which a lower potential than that of the first electrode is applied at driving. Reference numeral 17 is an electron emitting layer which is located on the cathode electrode 4 and comprises an electron emitting member. Also, in the electron emitting device of the present invention, there is the case where the cathode electrode (second electrode) 4, together with the electron emitting layer 17, is called "the cathode electrode".

The cathode electrode (second electrode) 4 is an electrode located to supplying electrons to the electron emitting layer 17, and here a member different from the electron emitting layer 17 is used. Effective work function of the electron emitting member (electron emitting layer 17) is lower than that of the cathode electrode 4. However, in the case where the electron emitting layer 17 itself has sufficient conductivity, the electron emitting layer 17 may be directly located on the insulating layer 3 without using the cathode electrode 4. In that case, the electron emitting layer 17 itself can perform also a function as the above cathode electrode. Thus, when the electron emitting layer is performs also the function as the cathode electrode, there is the case where the electron emitting layer is called the cathode electrode (second electrode).

Also, in the electron emitting device with the structure as shown in FIGS. 1 to 3, reference symbol W1 denotes a width of the cathode electrode 4, D1 denotes the sum of the thicknesses of the cathode electrode 4 and the electron emitting layer 17, D2 denotes a thickness of the insulating layer 3, and D3 denotes a distance between an anode 12 and the electron emitting layer 17.

Note that, as described above, in the case of the electron emitting device with a structure in that the electron emitting layer 17 is directly located on the insulating layer 3 without using the cathode electrode 4, the above W1 denotes the width of the electron emitting device 17, and D1 denotes the thickness of the electron emitting layer 17.

Reference symbol Vg denotes a voltage applied between the gate electrode 2 and the cathode electrode 4 in electron emitting. Also, Va denotes a voltage applied between the cathode electrode 4 and the anode 12 in electron emitting. Note that Va is higher than Vg. Further, Ie denotes an emitting current that reaches the anode 12 from the electron emitting layer 17.

Reference symbol Eh denotes an electric field formed by potentials of the cathode electrode 4 and the gate electrode 2 when the above Vg is applied. Reference numeral 6 denotes an equipotential surface formed between the substrate 1 and the anode (electrode) 12 when the electron emitting apparatus (image forming apparatus) using the electron emitting device of the present invention is driven.

A form of the equipotential surface 6 and the electric field Eh are determined by, Va and Vg, which are applied when electrons are emitted from the electron emitting device of the present invention, D2, W1, and D1, which represent shapes of the device, and the like.

Figure 5:
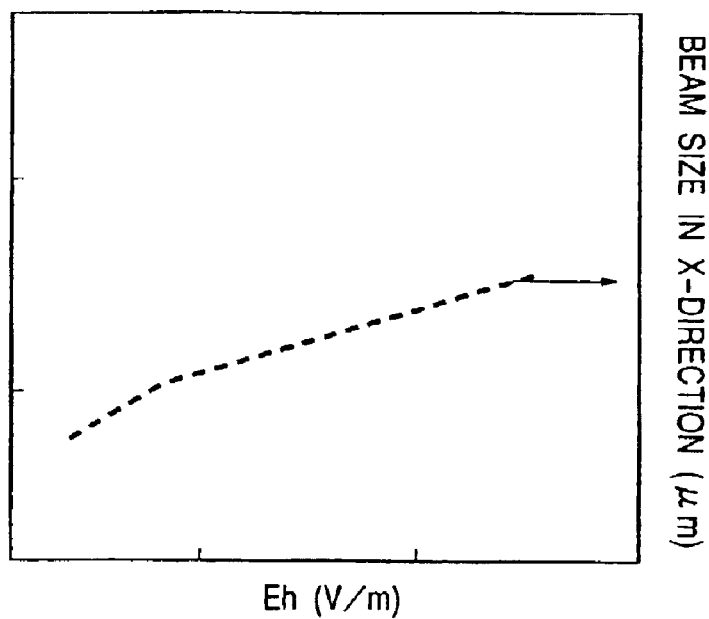
FIG. 5 is a graph representing the dependence of an electric field Eh to an electron beam size.
Figure 8:
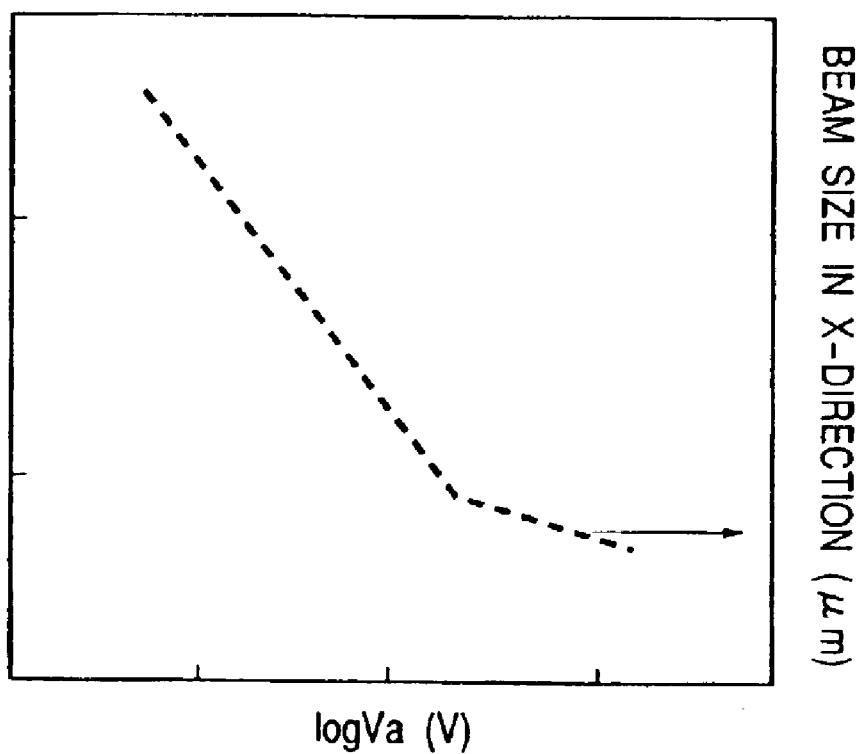
FIG. 8 is a graph representing the dependence of Va to the electron beam size.

A size of the electron beam formed on the anode 12 by electrons emitted from the device of the present invention is shown in FIGS. 5 and 8. As the electric field Eh is increased and/or Va is decreased, the size of the electron beam tends to increase. These parameters can be arbitrarily changed and values suitable for a use application of the electron emitting device can be selected.

On the above principle, electrons are emitted from the electron emitting layer 17 which faces the side of the anode 12, to a vacuum.

That is, in the electron emitting device of the present invention, basically, electrons are emitted from the electron emitting layer 17 which faces the side of the anode 12, to a vacuum, by the electric field Eh (the voltage Vg) formed between the cathode electrode 4 (electron emitting layer 17) and the gate electrode 2.

In the device of the present invention, since the gate electrode 2 is located in the side of the electron emitting layer 17 opposite to the side of the anode 12, obstacles which prevent the trajectory of electrons toward the anode 12 and a potential that produces obstacles, are not present between the electron emitting layer 17 and the anode 12. Thus, since all the emitting electrons almost become Ie, even with a low voltage, very high efficiency is obtained.

Also, according to the present invention, in the case where the electron emitting area is widest, its area corresponds to the entire surface of the electron emitting layer 17 in the side of the anode 12. Thus, since the electron emitting area is wide, the durability to the bombardment of ions present in a vacuum is high.

According to the device of the present invention, the distortion of the equipotential surface between the surface of the electron emitting layer 17 and the anode 12 is less and a uniform potential distribution is formed. Thus, electrons emitted to a vacuum are moved toward the anode 12, and the spread of the electron beam is small. That is, the diameter of the electron beam is small.

Figure 7A:
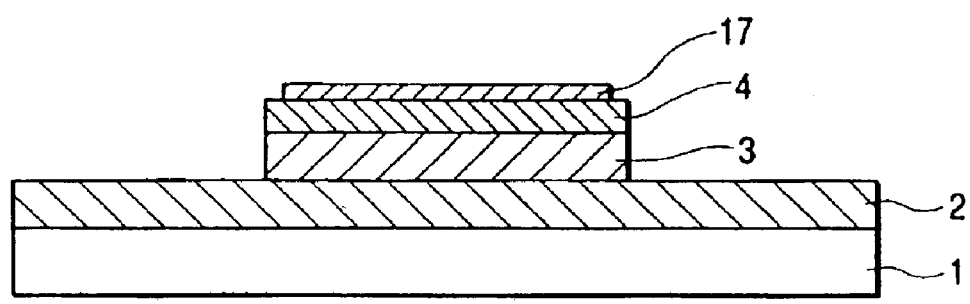
FIGS. 7A and 7B are schematic views representing one example of a further preferred embodiment of the electron emitting device according to the present invention.

Also, as shown in FIG. 2, the width of the electron emitting layer 17 is assumed equal to that of the cathode electrode 4. However, as shown in FIG. 7A, there is the case where the width (W1) of the electron emitting layer 17 is made narrower than that of the cathode electrode 4. In other wards, the ends (side surfaces) of the electron emitting layer 17 are located inside the ends (side surfaces) of the cathode electrode 4. According to such a configuration, "an ineffective current" produced by flowing electrons emitted from the electron emitting layer 17 into the gate electrode 2, can be suppressed. Also, according to the configuration as shown in FIG. 7A, since the equipotential surface in the vicinity of the ends of the electron emitting layer 17 is approximately parallel to the anode 12, the spread of the electron beam can be suppressed.

Further, the device of the present invention has a very simple structure in that laminating is repeated. Thus, the manufacturing process is easy and the device can be manufactured with a high yield.

Furthermore, according to the electron emitting device of the present invention, in addition to the structure as shown in FIGS. 1 to 3, when opening regions are provided in at least the electron emitting layer 17 (and the cathode electrode 4), the diameter of the electron beam with respect to the emitted electrons can be further made small.

An example of configuration having such opening regions will be described below using FIGS. 40 to 43.

Figure 40:
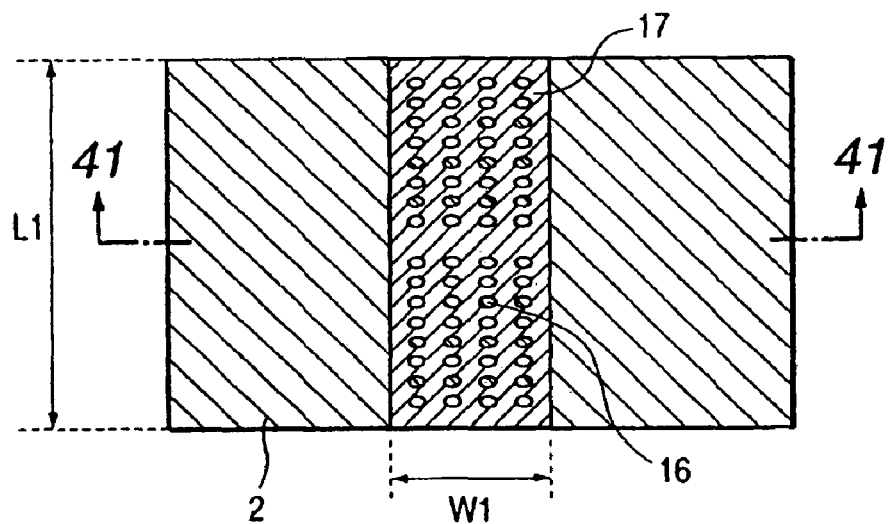
FIG. 40 is a schematic plane view of another configuration of an electron emitting device according to another embodiment of the present invention.
Figure 41:
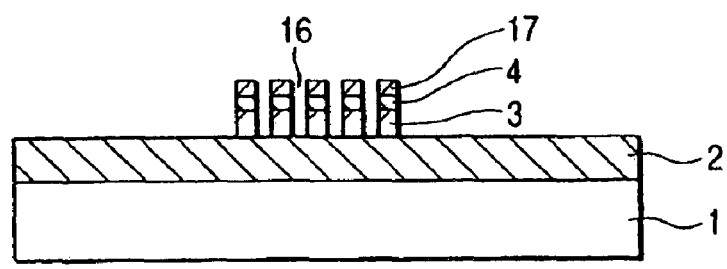
FIG. 41 is a schematic cross sectional view along line 41—41 in FIG. 40, showing the electron emitting device according to another embodiment of the present invention.
Figure 42:
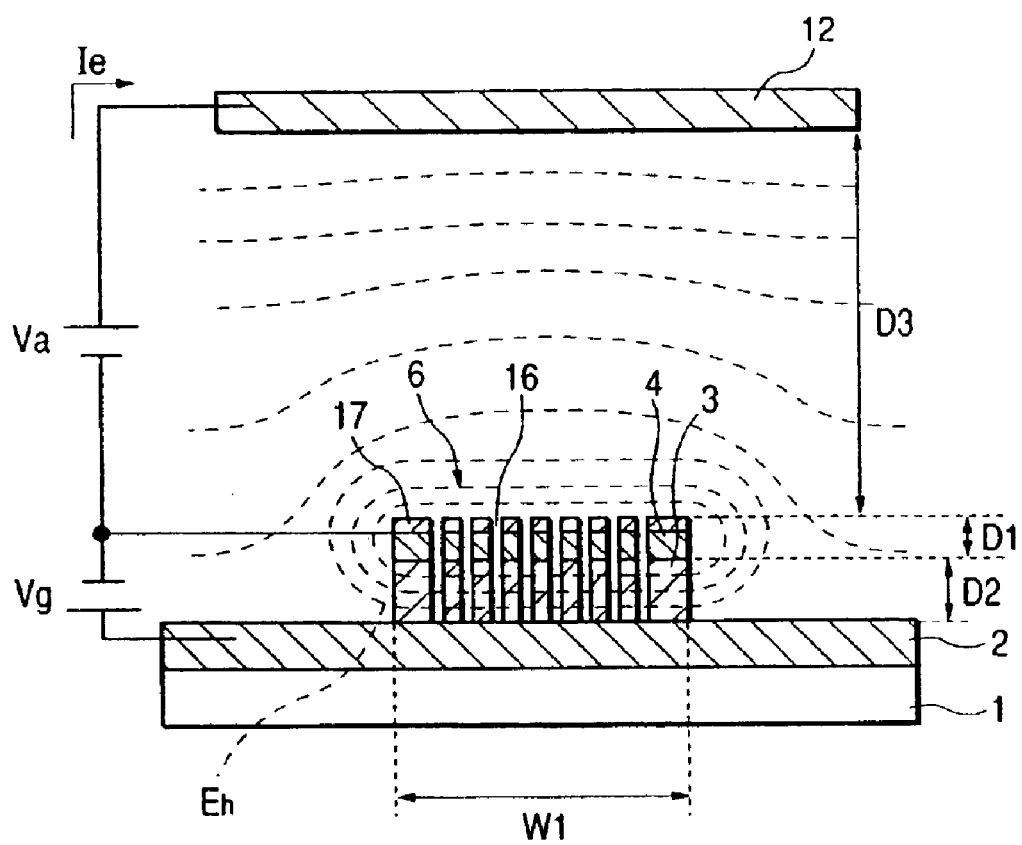
FIG. 42 shows a state that the electron emitting device according to another embodiment of the present invention is driven.

FIG. 40 is a schematic plane view representing an electron emitting device having the above opening regions and FIG. 41 is a cross sectional view along a line 41—41 in FIG. 40. Also, FIG. 42 is a schematic view representing a state in the case where the electron emitting apparatus (image forming apparatus) using this device is driven (made to emit electrons) and FIG. 43 is a schematic enlarged view of the vicinity of the opening regions 16 of the device.

In FIGS. 40 to 43, reference numeral 1 denotes a substrate, 2 denotes a gate electrode (first electrode), 3 denotes an insulating layer, 4 denotes a cathode electrode (second electrode). Reference numeral 17 is an electron emitting layer, which is located on the cathode electrode 4 and comprises an electron emitting member. Also, in the electron emitting device of the configuration of FIG. 40, there is the case where the cathode electrode (second electrode) 4, together with the electron emitting layer 17, is called "the cathode electrode".

In the example described here, the cathode electrode (second electrode) 4 is an electrode located to supplying electrons to the electron emitting layer 17, and other member different from the electron emitting layer 17 is used. Effective work function of the electron emitting member (electron emitting layer 17) is lower than that of the cathode electrode 4. However, as described above, in the case where the electron emitting layer 17 itself has sufficient conductivity, the electron emitting layer 17 may be directly located on the insulating layer 3 without using the cathode electrode 4. In the case, the electron emitting layer 17 itself can be combined with a function as the above cathode electrode. Thus, when the electron emitting layer is combined with the function as the cathode electrode, there is the case where the electron emitting layer is called the cathode electrode (second electrode).

Figure 43:
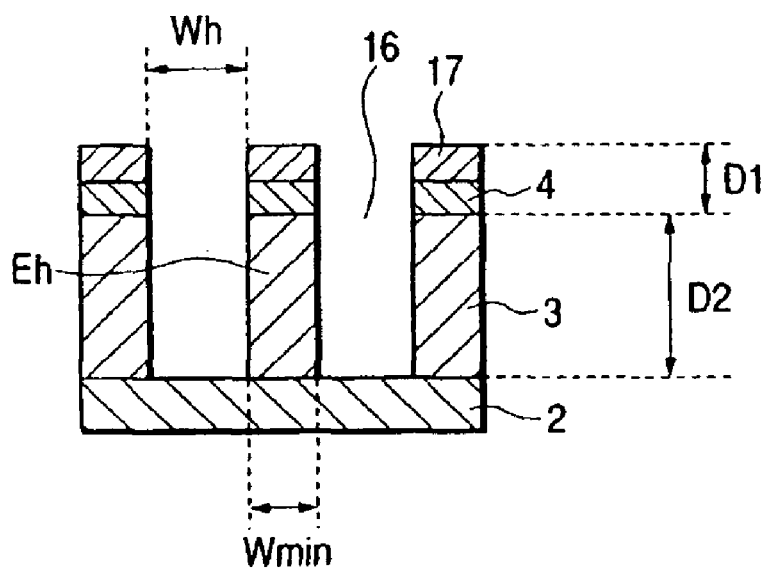
FIG. 43 is a schematic view enlarging a cross section of the electron emitting device according to another embodiment of the present invention.

As shown in FIG. 43, the electron emitting layer 17, the cathode electrode 4, and a plurality of holes (opening regions) 16 which penetrate the insulating layer 3 are provided in the device shown in FIG. 40.

In FIGS. 40 to 43, reference symbol W1 denotes a width of the cathode electrode 4 (electron emitting layer 17) and L1 denotes a length of the cathode electrode 4. Reference symbol Wh denotes a diameter of the holes (openings) 16 and Wmin denotes a minimum distance between adjacent holes (openings) 16. Reference symbol D1 denotes the sum of thicknesses of the cathode electrode 4 and the electron emitting layer 17, D2 denotes a thickness of the insulating layer 3, and D3 denotes a distance between an anode 12 and the surface of the electron emitting layer 17.

Note that, as described above, in the case of the electron emitting device with a structure in that the electron emitting layer 17 is directly located on the insulating layer 3 without using the cathode electrode 4, the above W1 denotes the width of the electron emitting device 17 and D1 denotes the thickness of the electron emitting layer 17.

Reference symbol Vg denotes a voltage applied between the gate electrode 2 and the cathode electrode 4 (electron emitting layer 17) in electron emitting. Also, Va denotes a voltage applied between the cathode electrode 4 (electron emitting layer 17) and the anode 12 in electron emitting by the electron emitting apparatus (image forming apparatus). Note that Va is higher than Vg. Reference symbol Ie denotes an emission current that is emitted from the electron emitting layer 17 and then reaches the anode 12.

According to the device with the configuration shown in FIGS. 40 to 43, the gate electrode 2 is exposed in the side of the anode 12 by the holes (openings) 17 which penetrate the insulating layer 3, the electron emitting layer 17 and the cathode electrode 4.

Therefore, by the influence of the potential of the gate electrode 2, as shown in FIG. 42, an equipotential surface 6 formed in the vicinity of the electron emitting layer 17 becomes flatter than that formed in the vicinity of the surface of the electron emitting layer 17 of the device with the configuration shown in FIG. 1. As a result, a beam spot formed on the anode 12 by the electron beam emitted from the electron emitting layer 17 of the device with this configuration can be made smaller than that formed on the anode 12 by the electron beam emitted from the device with the configuration shown in FIG. 1.

Note that, in the device with the configuration shown in FIGS. 40 to 43, as a further preferred configuration, the configuration in that the openings 16 penetrate the insulating layer 3 in addition to the electron emitting layer 17 (and the cathode electrode 4) is described. However, the openings 16 do not necessarily penetrate the insulating layer 3. That is, the configuration may be made such that the potential of the gate electrode 4 influences the surface of the electron emitting layer by the openings 16. Thus, it is required that the openings 16 penetrate at least the electron emitting layer 17 (and the cathode electrode 4).

Next, one example of a method of manufacturing the electron emitting device of the present invention with the configuration shown in FIGS. 1 to 3 will be described with reference to FIGS. 4A to 4D.

(Process A) Either one selected from quartz glass, glass with a reduced content of an impurity such as Na, soda lime glass, a lamination in which $SiO_2$ is laminated on a silicon substrate or the like by a sputtering method or the like, and an insulating substrate of ceramic such as alumina, which is sufficiently washed in advance at its surface, is used as a substrate 1, and then the gate electrode 2 is laminated on a surface of the substrate 1. The gate electrode 2 has a first surface which is in contact with the substrate and a second surface which is opposite to the first surface.

The gate electrode (first electrode) 2 has conductivity and is formed by a general vacuum film forming technique such as an evaporation method or a sputtering method, a photolithography technique, or the like. A material for the gate electrode 2 is suitably selected from, for example, metal such as Be, Mg, Ti, Zr, Hf, V, Nb, Ta, Mo, W, Al, Cu, Ni, Cr, Au, Pt, or Pd, these alloy materials, carbide such as TiC, ZrC, HfC, TaC, SiC, or WC, boride such as $HfB_2$, $ZrB_2$, $LaB_6$, $CeB_6$, $YB_4$ or $GdB_4$, nitride such as TiN, ZrN, or HfN, semiconductor such as Si or Ge, and the like. A thickness of the gate electrode 2 is set in a range of several tens of nm to several mm, preferably, in a range of several hundreds of nm to several $\mu$m.

(Process B) Next, following the gate electrode 2, the insulating layer 3 is deposited. The insulating layer 3 is formed by a general vacuum deposition method such as a sputtering method, a CVD method, or a vacuum evaporation method, and its thickness is set in a range of several nm to several pm, preferably, in a range of several tens of nm to several hundreds of nm. As this material, a high-voltage-resistant material capable of resisting a high electric field, such as $SiO_2$, SiN, $Al_2O_3$, CaF, or undoped diamond, is preferred. The insulating layer 3 has a first surface which is in contact with the second surface of the gate electrode 2 and a second surface which is opposite to the first surface.

(Process C) Further, following the insulating layer 3, the cathode electrode (second electrode) 4 is deposited. The cathode electrode 4 has conductivity as does the gate electrode 2 and is formed by a general vacuum deposition technique such as an evaporation method or a sputtering method, or a photolithography technique. The cathode electrode 4 has a first surface which is in contact with the second surface of the insulating layer 3 and a second surface which is opposite to the first surface.

A material for the cathode electrode 4 is suitably selected from, for example, metal such as Be, Mg, Ti, Zr, Hf, V, Nb, Ta, Mo, W, Al, Cu, Ni, Cr, Au, Pt, or Pd, these alloy materials, carbide such as TiC, ZrC, HfC, TaC, SiC, or WC, boride such as $HfB_2$, $ZrB_2$, $LaB_6$, $CeB_6$, $YB_4$ or $GdB_4$, nitride such as TiN, ZrN, or HfN, semiconductor such as Si or Ge, an organic polymer material, and the like. A thickness of the cathode electrode 4 is set in a range of several nm to several $\mu$m, preferably, in a range of several nm to several hundreds of nm.

Note that, the electrodes 2 and 4 may be formed using the same materials or different materials, and by the same forming method or different forming methods.

Also, it is preferred that a material having a higher work function than that of a material composing the electron emitting layer 17 to be formed in the next process is used for the material of the cathode electrode 4.

Figure 4A:
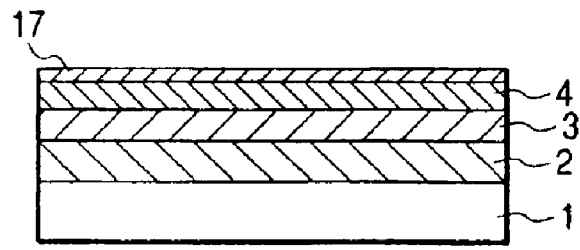
FIGS. 4A, 4B, 4C and 4D show one example of a method of manufacturing the electron emitting device according to the present invention.

(Process D) Next, as shown in FIG. 4A, the electron emitting layer 17 is deposited on the cathode electrode 4 (on the second surface of the cathode electrode 4). The electron emitting layer 17 is formed by locating an electron emitting member on the cathode electrode using a general vacuum film forming technique such as an evaporation method or a sputtering method, or a photolithography technique.

The electron emitting member composing the electron emitting layer 17 is suitably selected from, for example, a carbon fiber (such as a carbon nanotube, a graphite nanofiber, or a diamond fiber), amorphous carbon, graphite, diamond like carbon, diamond, and carbon or carbon compound in which materials described above are dispersed.

As the electron emitting layer 17, in particular, when "an electroconductive carbon layer" containing mainly a member selected from an electroconductive carbon fiber (such as a carbon nanotube or a graphite nanofiber), graphite, or electroconductive diamond, is used, a preferable electron emitting characteristic can be obtained. Thus, this electroconductive carbon layer is preferred.

Also, even if the above "electroconductive carbon layer" containing mainly a mixture of two or more kinds of members selected from an electroconductive carbon fiber (such as a carbon nanotube or a graphite nanofiber), graphite, and electroconductive diamond, is used, a preferable electron emitting characteristic can be obtained. Thus, this electroconductive carbon layer is preferred.

Further, even if the above "electroconductive carbon layer" is mixed with at least one member selected from amorphous carbon, tetrahedral amorphous carbon, metal, semiconductor, diamond, and diamond fiber, a preferable electron emitting characteristic can be obtained. Thus, this electroconductive carbon layer is preferred.

A thickness of the electron emitting layer 17 is set in a range of several nm to several hundreds of nm, preferably, several nm to several tens of nm.

Also, there is the case where, without depositing the electron emitting layer 17 in this process, etching processes (Process E and Process F) as next processes are performed to form a lamination structure, and then the above electron emitting layer 17 is selectively deposited on a portion or the entire surface of the cathode electrode 4.

Figure 4B:
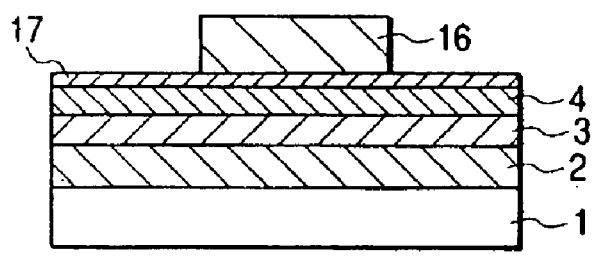

(Process E) Next, as shown in FIG. 4B, a mask pattern 16 is formed by a photolithography technique.

Figure 4C:
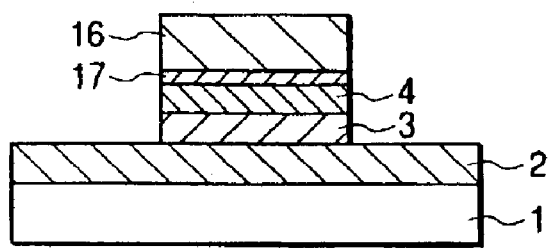

(Process F) Then, the structure in which the above mask pattern 16 is formed is processed by etching. As a result, as shown in FIG. 4C, a lamination structure in that portions of the insulating layer 3, the cathode electrode 4, and the electron emitting layer 17 on the gate electrode 2 are removed, is formed. Note that, this etching process may be stopped on the high potential electrode (gate electrode) 2, or a portion of the high potential electrode 2 may be etched.

In the etching process, it is desirable that a smooth and vertical etching surface is formed. An etching method may be selected in accordance with materials of the insulating layer 3, the cathode electrode 4, and the electron emitting layer 17.

Figure 7B:
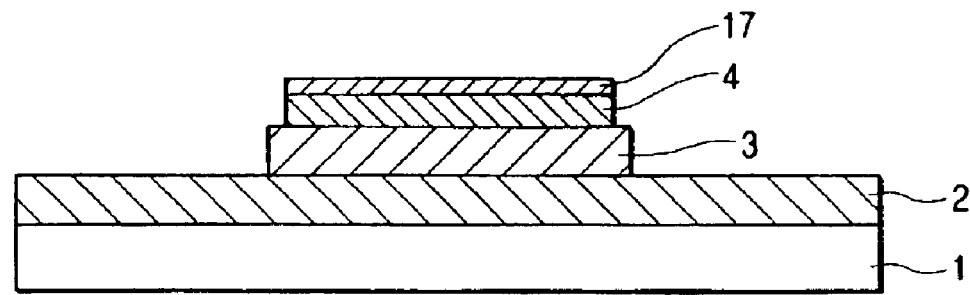

Note that, as shown in FIG. 7B, there is the case where, the ends (side surfaces) of the cathode electrode 4 and the electron emitting layer 17 are overetched in comparison with the ends (side surfaces) of the insulating layer 3, and thus the ends (side surfaces) of the cathode electrode 4 and the electron emitting layer 17 are backed relatively to the ends (side surfaces) of the insulating layer 3. If such an overetching is made, "a reactive current" flowing between the cathode electrode 4 (electron emitting layer 17) and the gate electrode 2 at driving can be suppressed. Thus, this is preferable.

Also, in addition to the configuration of FIG. 7B, only a relation between the cathode electrode 4 and the electron emitting layer 17 is made to be the above described relation as shown in FIG. 7A. Thus, "the reactive current" at driving can be further suppressed.

Also, a dielectric such as $SiO_2$ is evaporated adjacent to the ends (side surfaces) of the cathode electrode 4 and the electron emitting layer 17. Thus, "the reactive current" at driving can be also suppressed.

Figure 4D:
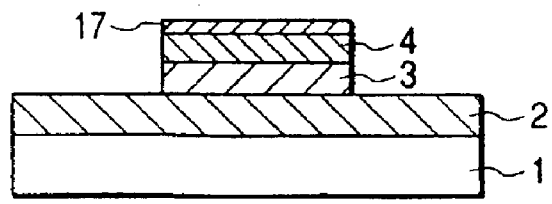

(Process G) Finally, as shown in FIG. 4D, the mask pattern 16 is peeled to complete the electron emitting device of the present invention. In the thus formed electron emitting device of the present invention, the first surfaces and the second surfaces of the gate electrode, the insulating layer, and the cathode electrode are substantially parallel to each other. The first surfaces and the second surfaces of the gate electrode, the insulating layer, and the cathode electrode are substantially parallel with the surface of the substrate 1. Also, the first surfaces and the second surfaces of the gate electrode, the insulating layer, and the cathode electrode are substantially vertical to the direction that the gate electrode, the insulating layer, and the cathode electrode are laminated on the substrate.

Also, there is the case where, without forming the electron emitting layer 17 in (Process D), after the mask pattern shown in (Process G) is removed, the electron emitting layer 17 is selectively deposited on the cathode electrode 4. For example, when a carbon fiber such as a carbon nanotube is used for the electron emitting layer 17, after a catalyst particle selected from materials (for example, Fe, Ni, and Pd) having a function for promoting the growth of carbon is located on the cathode electrode, a CVD method using a carbon compound such as methane, or the like, is performed.

Also, there is the case where a processing for limiting the electron emitting region of the electron emitting layer 17 is performed. For example, when a concave portion is formed in a portion of the electron emitting layer 17, the emitting region can be limited by such as utilizing a shape effect of the concave portion.

The width W1 of the cathode electrode is suitably set in accordance with materials composing the device and resistances of the materials, a work function of the material of the cathode electrode and a driving voltage Vg thereof, and a necessary form of the electron emitting beam. Generally, W1 is selected from a range of several hundreds of nm to several tens of $\mu$m. The electrode length L1 is suitably set in accordance with materials composing the device and resistances of the materials, and the arrangement of the electron emitting device. Generally, L1 is selected from a range of several $\mu$m to several hundreds of $\mu$m.

Here, the example that the electron emitting layer 17 and the-cathode electrode (second electrode) 4 are formed with different members (two-layered structure), is described. However, if sufficient conductivity is provided for the electron emitting layer 17, without using the cathode electrode (second electrode) 4, the electron emitting layer 17 can be combined with the function as the second electrode 4. Thus, when the electron emitting layer 17 is combined with the function as the electrode, a manufacturing process is further simplified, and thus this is preferable.

Next, one example of a method of manufacturing the electron emitting device with the above described structure as shown in FIGS. 40 to 43 will be described below using FIGS. 44A to 44D.

With respect to the electron emitting device with the structure as shown in FIGS. 40 to 43, the same processes as the above processes of (Process A) to (Process D) are performed. Thus, only processes ((Process E1) to (Process I1)) different from the above processes of (Process E) to (Process G) will be described here using FIGS. 44A to 44D. Also, with respect to respective constitution members of the electron emitting device with the structure as shown in FIGS. 40 to 43, respective constitution members of the electron emitting device with the structure as shown in FIGS. 1 to 3 can be similarly applied.

(Process E1)

An anodizable layer 18 as an anodizable material is deposited on a portion of the electron emitting device 17. The anodizable layer 18 is formed by a general vacuum film forming technique such as an evaporation method or a sputtering method, or a photolithography technique. A deposition region of the anodizable layer 18 becomes the electron emitting region later, and suitably set if necessary. As a material for the anodizable layer 18, for example, metal such as Al, Ta, Nb, Ti, Zr, Hf, or Si, or semiconductor, which is anodizable, is used. A film thickness of the anodizable layer 18 is arbitrarily set in a range that the pores are formed by the anodization, preferably, in a range of several nm to several hundreds of nm.

Figure 44A:
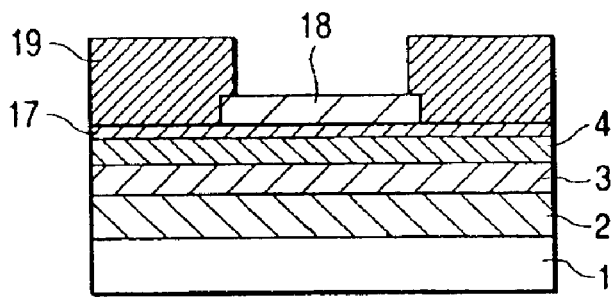
FIGS. 44A, 44B, 44C and 44D are schematic views of a method of manufacturing the electron emitting device according to another embodiment of the present invention.

Next, a mask pattern 19 is formed by a photolithography technique to expose a portion to be anodized of the anodizable layer 18 (FIG. 44A).

(Process F1)

Figure 44B:
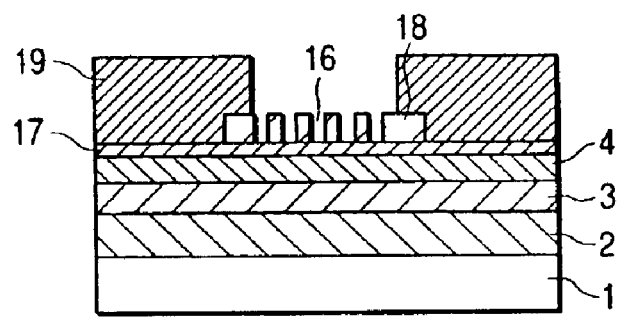

Next, as shown in FIG. 44B, the exposed anodizable layer 18 is anodized to form the pores 16 which penetrate the anodizable layer 18. Concretely, the anodization is performed in an electrolytic solution using the anodizable layer 18 as an anode. The electrolytic solution is, for example, in metal such as Al, an aqueous solution of inorganic acid such as sulfuric acid, sulfamic acid, or phosphoric acid, or an aqueous solution of organic acid such as oxalic acid, malonic acid, or succinic acid. Further, as a material added as a solvent, there is polyhydric alcohol such as ethylene glycol, glycerin, or dextrin.

On the other hand, when Si is used as the material of the anodizable layer 18, an HF aqueous solution is used as the electrolytic solution.

An interval between the pores 16 formed by the above anodization can be controlled by an anodization voltage. Also, a depth of the pores 16 can be controlled by an anodization time. Further, a diameter of the pores 16 can be controlled with a condition such as the composition of an electrolytic solution, a voltage, and a current.

(Process G1)

Next, a process which is called a widening process is performed for the substrate on which the anodizable layer 18 is formed. Concretely, the structure in which the pores 16 are formed, as shown in FIG. 44B, is immersed into an acid solution such as phosphoric acid. Thus, a process for adjusting (widening) the diameter of the pores 16 is performed. After this widening process, the structure as shown in FIG. 44B is sufficiently washed and dried.

Here, the diameter of the pores 16 formed by the anodization is several tens of nm to several hundreds of nm, and the density thereof is $10^6$ to $10^7$ cm$^2$/pore.

(Process H1)

Figure 44C:
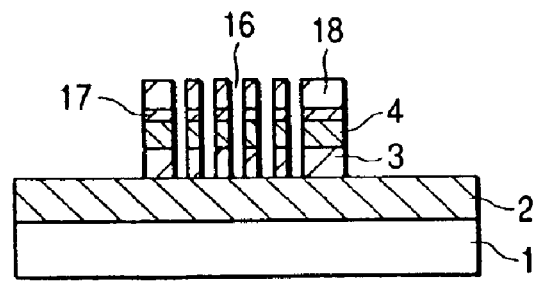

Next, the mask pattern 19 is peeled, and then the electron emitting layer 17, the cathode electrode 4, and the insulating layer 3 are etched using the pores 16 as masks to form the openings 16 which penetrate the electron emitting layer 17, the cathode electrode 4, and the insulating layer 3 (FIG. 44C).

Note that this etching process may be stopped on the gate electrode 2, or a portion of gate electrode 2 may be etched.

Here, the example that the pores (openings) 16 which penetrate the electron emitting layer 17, the cathode electrode (second electrode) 4, and the insulating layer 3 are formed, is described. However, the openings 16 may be ones which penetrate at least the above electron emitting layer 17 and the cathode electrode (second electrode) 4.

However, in order to decrease a capacitance component due to the insulating layer 3 and to further flatten the equipotential surface 6 formed in the vicinity of the electron emitting region of the electron emitting layer 17, it is preferable that opening regions communicated with the openings which penetrate the electron emitting layer 17 and the cathode electrode 4, are provided in the insulating layer.

Further, in order to flatten the equipotential surface 6 formed in the vicinity of the electron emitting region, it is preferable that the opening regions formed in the insulating layer 3 penetrate the insulating layer 3 so as to expose the gate electrode (first electrode) 2.

Also, in order to further flatten the equipotential surface 6 formed in the vicinity of the electron emitting region of the above electron emitting layer 17 and to increase an amount of the emitting electron, it is preferable that a plurality of openings 16 are provided.

Also, even in the electron emitting device of this configuration, as described above using FIG. 7A, it is preferable that, the outer circumference of the electron emitting layer 17 is located inside the outer circumference of the cathode electrode 4, and thus a reactive current at driving of the electron emitting device is further suppressed.

(Process I1)

Figure 44D:
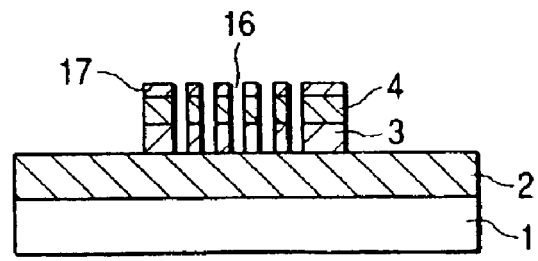

Finally, as shown in FIG. 44D, the anodizable layer 18 used as the mask is peeled to complete the device of the present invention.

Here, the example that the electron emitting layer 17 and the cathode electrode (second electrode) 4 are formed with different members (two-layered structure), is described. However, even in the electron emitting device of this configuration, as described in the device shown in FIG. 1, if the electron emitting layer 17 has sufficient conductivity, the electron emitting layer 17 is directly located on the insulating layer 3 without using the cathode electrode 4. Thus, the electron emitting layer 17 itself can be combined with the function as the above cathode electrode.

An application example of the electron emitting device of the present invention will be described below. For example, an electron source or an image forming apparatus can be constructed by arranging a plurality of electron emitting devices of the present invention on a substrate.

With the electron emitting devices, various arrangements are utilized. There is the following passive matrix arrangement as one example. That is, a plurality of electron emitting devices are arranged in a matrix form along an X-direction and a Y-direction. One electrode of respective electron emitting devices located in the same row is commonly connected with the wiring of the X-direction. The other electrode of respective electron emitting devices located in the same column is commonly connected with the wiring of the Y-direction. Hereinafter, the passive matrix arrangement will be described in detail.

Figure 9:
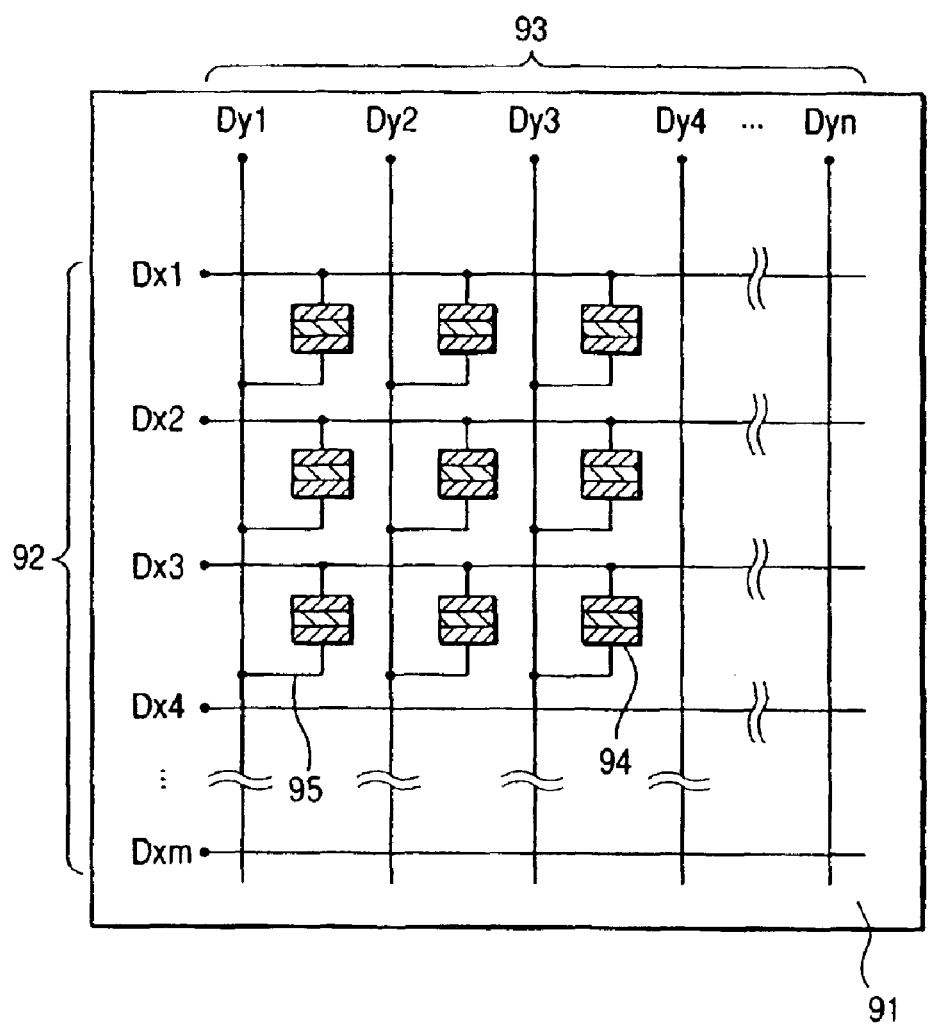
FIG. 9 is a schematic structure view representing an electron source with a passive matrix arrangement according to the present invention.

An electron source obtained by arranging a plurality of electron emitting devices to which the present invention can be applied will be described using FIG. 9. In FIG. 9, reference numeral 91 denotes an electron source substrate, 92 denotes X-directional wirings, and 93 denotes Y-directional wirings. Also, reference numeral 94 denotes electron emitting devices of the present invention and 95 denotes connections.

The m X-directional wirings 92 include Dx1, Dx2, . . . , Dxm, and can be composed of electroconductive metal or the like, which is formed using a vacuum evaporation method, a printing method, a sputtering method, or the like. A material, a film thickness, and a width of the wirings are suitably designed. The n Y-directional wirings 93 include Dy1, Dy2, . . . , Dyn, and is formed as the X-directional wirings 92. An interlayer insulating layer (not shown) is provided between the m X-directional wirings 92 and the n Y-directional wirings 93 and separates both wirings (both m and n are a positive integers).

The interlayer insulating layer (not shown) is composed of $SiO_2$ or the like, which is formed using a vacuum evaporation method, a printing method, a sputtering method, or the like. For example, the interlayer insulating layer is formed with a predetermined shape in the entire surface or a portion of the substrate 91 on which the X-directional wirings 92 are formed. In particular, a film thickness, a material, and a manufacturing method are suitably set such that the interlayer insulating layer can resist a potential difference in intersection portions of the X-directional wirings 92 and the Y-directional wirings 93. The X-directional wirings 92 and the Y-directional wirings 93 each are led as external terminals.

A pair of electrodes (not shown) composing the electron emitting device 94 are electrically connected with the m X-directional wirings 92 and the n Y-directional wirings 93 through the connections 95 made of electroconductive metal or the like.

With respect to a material composing the X-directional wirings 92 and the Y-directional wirings 93, a material composing the connections 95, and a material composing the pair of device electrodes, a part or all of the composition elements may be the same or different from each other.

These materials are suitably selected from, for example, the materials of the device electrodes (electrodes 2 and 4) described above. In the case where the material composing the device electrodes is the same material as the wirings, the wirings connected with the device electrode can be also called the device electrode.

Scan signal applying means (not shown) for applying a scan signal for selecting a row of the electron emitting devices 94 arranged in the X-direction, is connected with the X-directional wirings 92. On the other hand, modulation signal generating means (not shown) for modulating respective columns of the electron emitting devices 94 arranged in the Y-direction, in response to an input signal, is connected with the Y-directional wirings 93. A driving voltage applied to the respective electron emitting devices is supplied as a difference voltage between the scan signal and a modulation signal, which are applied to the device.

In the above structure, respective devices are selected using the passive matrix wirings and thus can be individually driven. An image forming apparatus constructed using the electron source with such a passive matrix arrangement will be described using FIG. 10. FIG. 10 is a schematic view representing one example of a display panel of the image forming apparatus.

In FIG. 10, reference numeral 91 denotes an electron source substrate arranged with a plurality of electron emitting devices, 101 denotes a rear plate with which the electron source substrate 91 is fixed, 106 denotes a face plate in which a fluorescent film 104 as a phosphor (image forming member), a metal back 105, and the like are formed in an inner surface of a glass substrate 103. Reference numeral 102 denotes a support frame. The rear plate 101 and the face plate 106 are connected with the support frame 102 using frit glass or the like. Reference numeral 107 denotes an envelope, and this envelope is constructed by seal bonding, for example, with baking in an air or in a nitrogen atmosphere at a temperature range of 400 to 500 degrees for 10 minutes or longer.

Reference numeral 94 corresponds to the electron emitting device in FIG. 1. Reference numerals 92 and 93 denote X-directional wirings and Y-directional wirings, respectively, which are connected with the pair of device electrodes 2 and 4 of the electron emitting device.

As described above, the envelope 107 is constructed by the face plate 106, the support frame 102, and the rear plate 101. The rear plate 101 is provided mainly for a purpose of reinforcing the substrate 91 by the increase of its strength. Thus, when the substrate 91 itself has a sufficient strength, the rear plate 101 as a different component can be omitted. That is, the support frame 102 is directly bonded by sealing to the substrate 91, and thus the envelope 107 may be constructed by the face plate 106, the support frame 102, and the substrate 91. On the other hand, when a support (not shown) which is called a spacer, is located between the face plate 106 and the rear plate 101, the envelope 107 having a sufficient strength against an air pressure can be constructed.

Figure 11A:
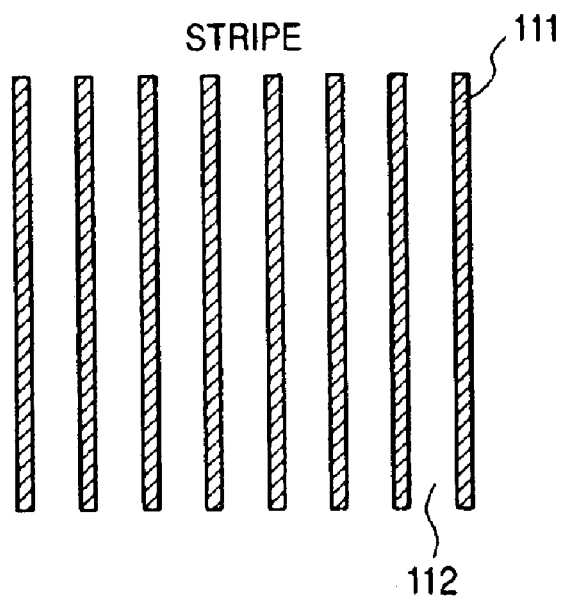
FIGS. 11A and 11B show fluorescent films in the image forming apparatus according to the present invention.
Figure 11B:
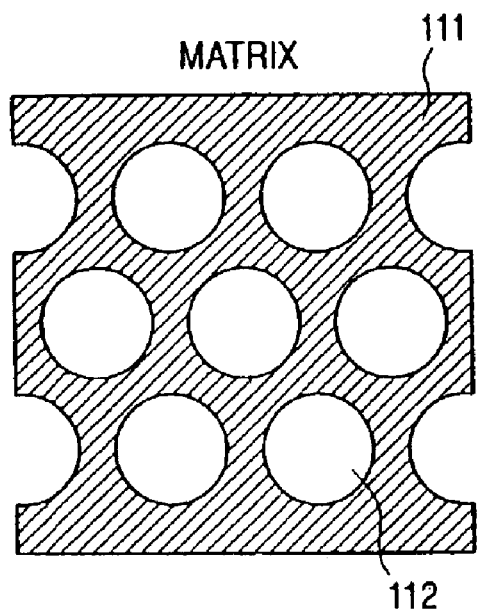

Note that, according to the image forming apparatus using the electron emitting device of the present invention, the phosphor (fluorescent film 104) is located by an alignment over the electron emitting devices 94 in view of the trajectory of the emitted electrons. FIGS. 11A and 11B are schematic views representing the fluorescent film 104 used in the panel of this apparatus. In the case of a color fluorescent film, this is constructed by a black color electroconductive member 111 and a phosphor 112, which are called a black stripe as shown in FIG. 11A, a black matrix as shown in FIG. 11B, or the like, with the arrangement of phosphors.

The image forming apparatus of the present invention can be used as a display apparatus for a television broadcast, a display apparatus for a television conference system, a computer, or the like. Further, the image forming apparatus can be used as an image forming apparatus or the like as a photo printer constructed using a photosensitive drum or the like.

Hereinafter, the embodiments of the present invention will be described in detail.

(Embodiment 1)

FIG. 1 is a plane view of an electron emitting device manufactured according to this embodiment, FIG. 2 shows one example of a cross sectional view, and FIGS. 4A to 4D show one example of a method of manufacturing the electron emitting device of this embodiment. Hereinafter, a process for manufacturing the electron emitting device of this embodiment will be described in details.

(Process 1)

First, as shown in FIG. 4A, after the substrate 1 using quartz is sufficiently washed, Ta as the gate electrode 2 having a thickness of 300 nm, $SiO_2$ as the insulating layer 3 having a thickness of 100 nm, and Ta as the cathode electrode 4 having a thickness of 20 nm are deposited in this order by a sputtering method. Subsequently, the electron emitting layer 17 of a diamond film having a thickness of about 100 nm is deposited on the cathode electrode 4 by a CVD method. As a reactive gas, a mixture gas of $CH_4$ and $H_2$ is used.

(Process 2)

Next, as shown in FIG. 4B, by photolithography, a spin coating of a positive type photoresist (AZ1500/by Clariant Corporation) is performed, and then a photomask pattern is exposed and developed, to form the mask pattern 16.

(Process 3)

As shown in FIG. 4C, using the mask pattern 16 as a mask, the electron emitting layer 17 of the diamond film on the cathode electrode 4 is dry-etched with $O_2$, and the cathode electrode 4 of Ta and the insulating layer 3 are dry-etched with a $CF_4$ gas. This dry etching is stopped in the gate electrode 2. Thus, the lamination structure having the width W1 of 2 $\mu$m and the length L1 of 50 $\mu$m is formed.

(Process 4)

As shown in FIG. 4D, the mask pattern 16 used as the mask is entirely removed to complete the electron emitting device of this embodiment.

The electron emitting device manufactured as described above is driven with the arrangement of FIG. 3. Assume that, as the driving voltages, Vg=30 V and Va=10 kV, and the distance D3 between the electron emitting device and the anode 12 is 2 mm. An electrode to which a phosphor is applied is used as the anode 12. Then, a size of the electron beam is observed. Here, the size of the electron beam is given as that corresponding to a range of a peak intensity of the phosphor light-emitted to 10% of its intensity. As a result, the diameter of the beam becomes 200 $\mu$m/180 $\mu$m (x/y).

(Embodiment 2)

As Embodiment 2, the example that the side surfaces of the electron emitting layer 17 are backed relatively to those of the insulating layer 3 and the cathode electrode 4 and thus the electron emitting layer 17 is provided in a region inside the insulating layer 3 and the cathode electrode 4, is shown.

Figure 12:
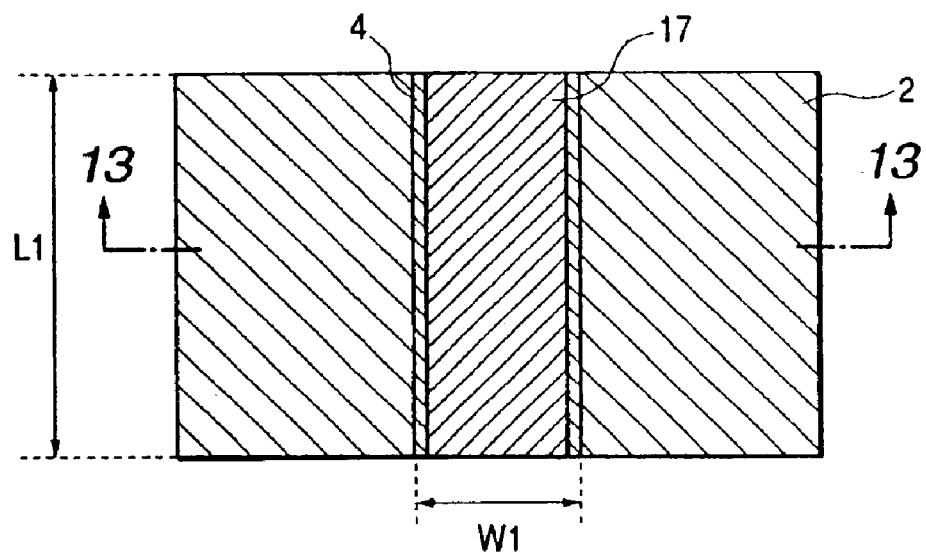
FIG. 12 is a plane view representing an electron emitting device according to Embodiment 2.
Figure 13:
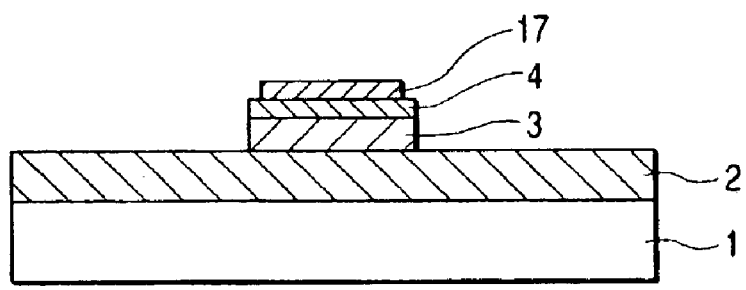
FIG. 13 is a cross sectional view along line 13—13 in FIG. 12, representing the electron emitting device according to Embodiment 2.

FIG. 12 is a plane view of an electron emitting device manufactured according to this embodiment, FIG. 13 shows one example of a cross sectional view along line 13—13 in FIG. 12, and FIGS. 14A to 14E show one example of a method of manufacturing the electron emitting device of this embodiment. Hereinafter, a process for manufacturing the electron emitting device of this embodiment will be described in details.

(Process 1)

Figure 14A:
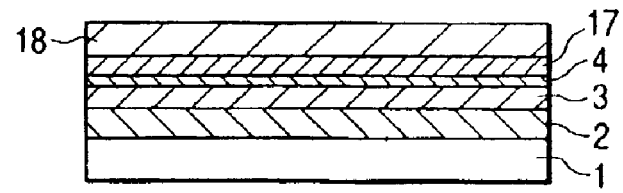
FIGS. 14A, 14B, 14C, 14D and 14E show one example of a method of manufacturing the electron emitting device according to Embodiment 2.

First, as shown in FIG. 14A, after the substrate 1 using quartz is sufficiently washed, Ta as the gate electrode 2 having a thickness of 300 nm, $SiO_2$ as the insulating layer 3 having a thickness of 100 nm, and Ta as the cathode electrode 4 having a thickness of 20 nm are deposited thereon in this order by a sputtering method. Subsequently, the electron emitting layer 17 of a diamond film having a thickness of about 100 nm is deposited on the cathode electrode 4 by a CVD method. As a reactive gas, a mixture gas of $CH_4$ and $H_2$ is used. Further, Al as a sacrificial layer 18 having a thickness of 100 nm is deposited on the electron emitting layer 17.

(Process 2)

Figure 14B:
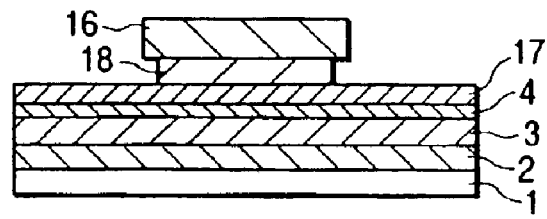

Next, as shown in FIG. 14B, by a photolithography, a spin coating of a positive type photoresist (AZ1500/by Clariant Corporation) is performed, and then a photomask pattern is exposed and developed to form the mask pattern 16. Then, using the patterned mask pattern 16 as a mask, the sacrificial layer 18 of Al is wet-etched using a mixture solution of phosphoric acid, oxalic acid, and acetic acid to transfer the mask pattern 16 of the photoresist to the sacrificial layer 18 of Al.

(Process 3)

Figure 14C:
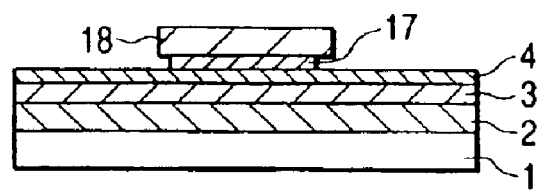

As shown in FIG. 14C, using the sacrificial layer 18 of Al as a mask, the electron emitting layer 17 of the diamond film is dry-etched using an $O_2$ gas with a higher $O_2$ gas pressure than that in Embodiment 1. Thus, the side surfaces of the electron emitting layer 17 of the diamond film are backed relatively to those of the sacrificial layer 18 of Al.

(Process 4)

Figure 14D:
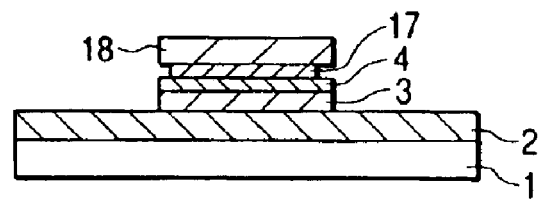

Subsequently, as shown in FIG. 14D, by the same method as Embodiment 1, the cathode electrode 4 and the insulating layer 3 are dry-etched with a $CF_4$ gas. This dry etching is stopped in the gate electrode 2. Thus, the lamination structure having the width W1 of 2 μm and the length L1 of 50 μm is formed.

(Process 5)

Figure 14E:
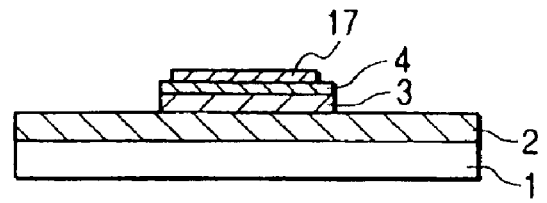

As shown in FIG. 14E, the sacrificial layer 18 of Al, used as the mask, is entirely removed to complete the device.

When the device manufactured as described above is driven with Vg=30 V, Va=10 kV, D3=2 mm, since the side surfaces of the electron emitting layer 17 are backed relatively to those of the cathode electrode 4 and then the electron emitting layer 17 is provided in a region inside the insulating layer 3 and the cathode electrode 4, a reactive current produced between the cathode electrode 4 and the gate electrode 2 at driving can be suppressed. Almost all emitted electrons are moved toward the anode. Therefore, the emitting current Ie is obtained with higher efficiency than that in Embodiment 1.

Figure 6:
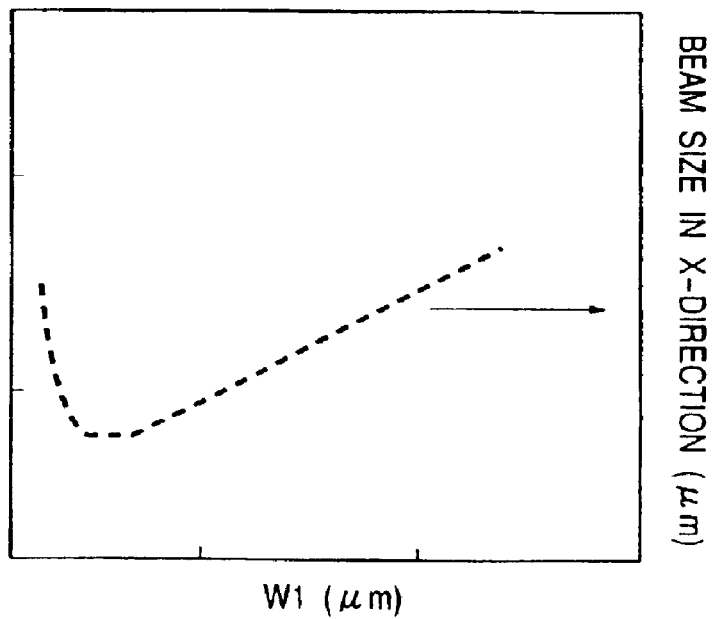
FIG. 6 is a graph representing the dependence of W1 to the electron beam size.

According to the device of this embodiment, the end portions of the electron emitting layer 17 are located inside those of the cathode electrode 4. Thus, the influence of the steep equipotential surface formed in the vicinity of the end portions of the cathode electrode 4 on the equipotential surface in the vicinity of the end portions of the electron emitting layer 17, can be reduced. As a result, the device of this embodiment has the characteristic as shown in FIG. 6. That is, with respect to the width W1 of the cathode electrode 4, a relative minimum value can be obtained at a certain point.

(Embodiment 3)

As Embodiment 3, the example that the side surfaces of the cathode electrode 4 and the electron emitting layer 17 are backed relatively to those of the insulating layer 3 and thus the cathode electrode 4 and the electron emitting layer 17 are provided in a region inside the insulating layer 3, is shown.

Figure 15:
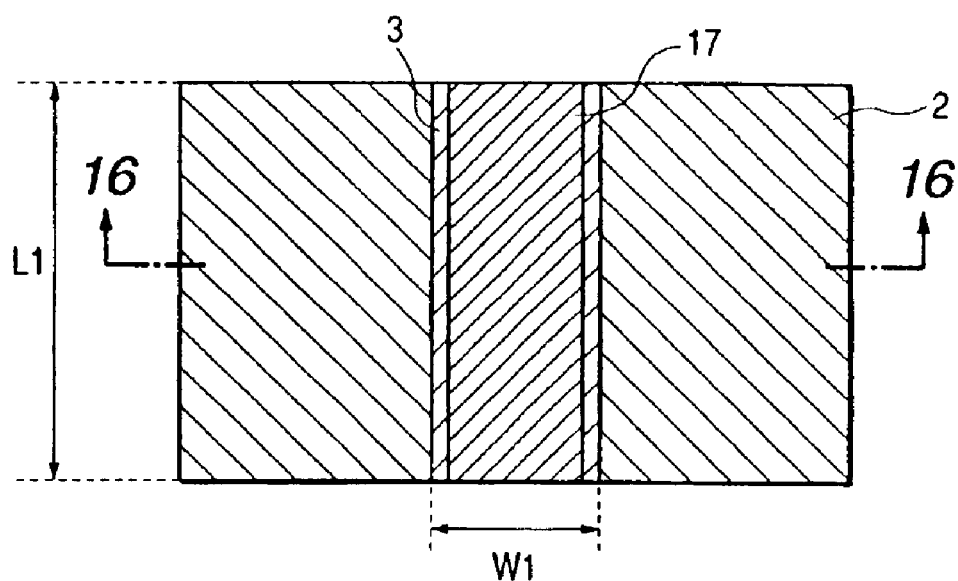
FIG. 15 is a plane view representing an electron emitting device according to Embodiment 3.
Figure 16:
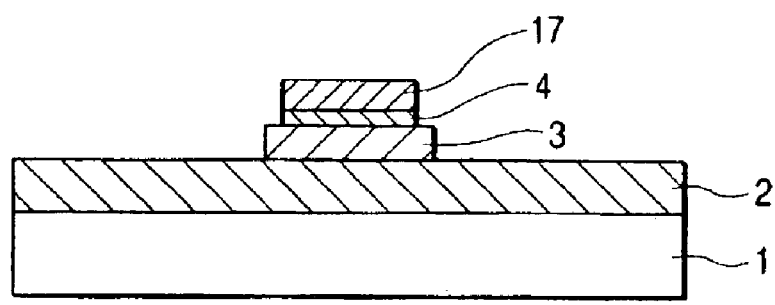
FIG. 16 is a cross sectional view representing the electron emitting device according to Embodiment 3.

FIG. 15 is a plane view of an electron emitting device manufactured according to this embodiment, FIG. 16 shows one example of a cross sectional view thereof, and FIGS. 17A to 17E show one example of a method of manufacturing the electron emitting device of this embodiment. Hereinafter, a process for manufacturing the electron emitting device of this embodiment will be described in details.

(Process 1)

Figure 17A:
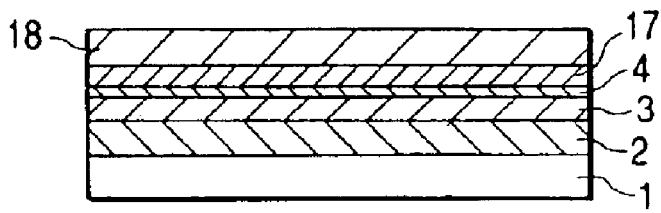
FIGS. 17A, 17B, 17C, 17D and 17E show one example of a method of manufacturing the electron emitting device according to Embodiment 3.

First, as shown in FIG. 17A, after the substrate 1 using quartz is sufficiently washed, Ta as the gate electrode 2 having a thickness of 300 nm, $SiO_2$ as the insulating layer 3 having a thickness of 100 nm, and Ta as the cathode electrode 4 having a thickness of 20 nm are deposited thereon in this order by a sputtering method. Subsequently, the electron emitting layer 17 of a diamond film having a thickness of about 100 nm is deposited on the cathode electrode 4 by a CVD method. As a reactive gas, a mixture gas of $CH_4$ and $H_2$ is used. Further, Al as a sacrificial layer 18 having a thickness of 100 nm is deposited on the electron emitting layer 17.

(Process 2)

Figure 17B:
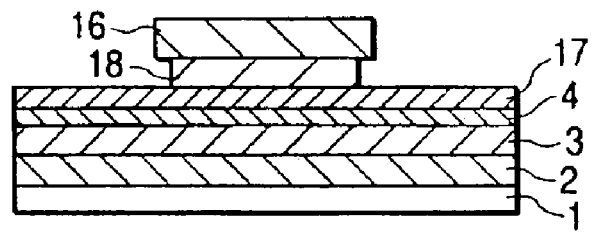

Next, as shown in FIG. 17B, by a photolithography, a spin coating of a positive type photoresist (AZ1500/by Clariant Corporation) is performed, and then a photomask pattern is exposed and developed to form the mask pattern 16. Then, using the patterned mask pattern 16 as a mask, the sacrificial layer 18 of Al is wet-etched using a mixture solution of phosphoric acid, oxalic acid, and acetic acid to transfer the mask pattern 16 of the photoresist to the sacrificial layer 18 of Al.

(Process 3)

Figure 17C:
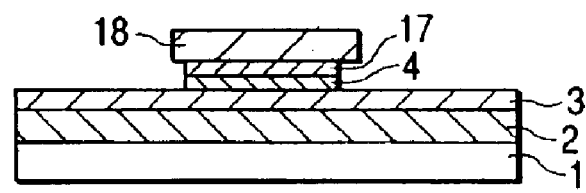

As shown in FIG. 17C, using the sacrificial layer 18 of Al as a mask, the electron emitting layer 17 of the diamond film is dry-etched using an $O_2$ gas with a higher $O_2$ gas pressure than that in Embodiment 1. Subsequently, using the sacrificial layer 18 of Al as a mask, the cathode electrode 4 of Ta is wet-etched using KOH. Thus, the side surfaces of the electron emitting layer 17 of the diamond film and the cathode electrode 4 of Ta are backed relatively to the mask of the sacrificial layer 18 of Al.

(Process 4)

Figure 17D:
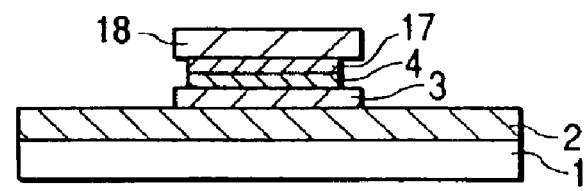

Subsequently, as shown in FIG. 17D, by the same method as Embodiment 1, the insulating layer 3 is dryetched with a $CF_4$ gas. This dry etching is stopped on the gate electrode 2.

(Process 5)

Figure 17E:
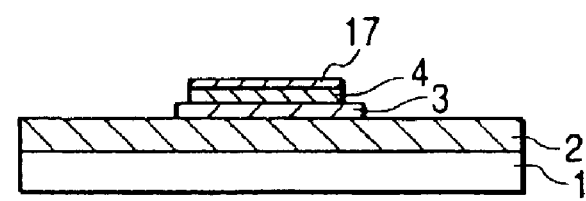

As shown in FIG. 17E, the sacrificial layer 18 of Al, used as the mask, is entirely removed to complete the device having the width W1 of 2 μm and the length L1 of 50 μm.

When the device manufactured as described above is driven with Vg=30 V, Va=10 kV, D3=2 mm, since the side surfaces of the electron emitting layer 17 and the cathode electrode 4 are backed relatively to those of the insulating layer 3 and then the electron emitting layer 17 and the cathode electrode 4 are provided in a region inside the insulating layer 3, a reactive current produced between the cathode electrode 4 and the gate electrode 2 at driving can be further suppressed.

(Embodiment 4)

As Embodiment 4, the example that dielectrics are located adjacent to the side walls of the cathode electrode 4 and the electron emitting layer 17, is shown.

Figure 18:
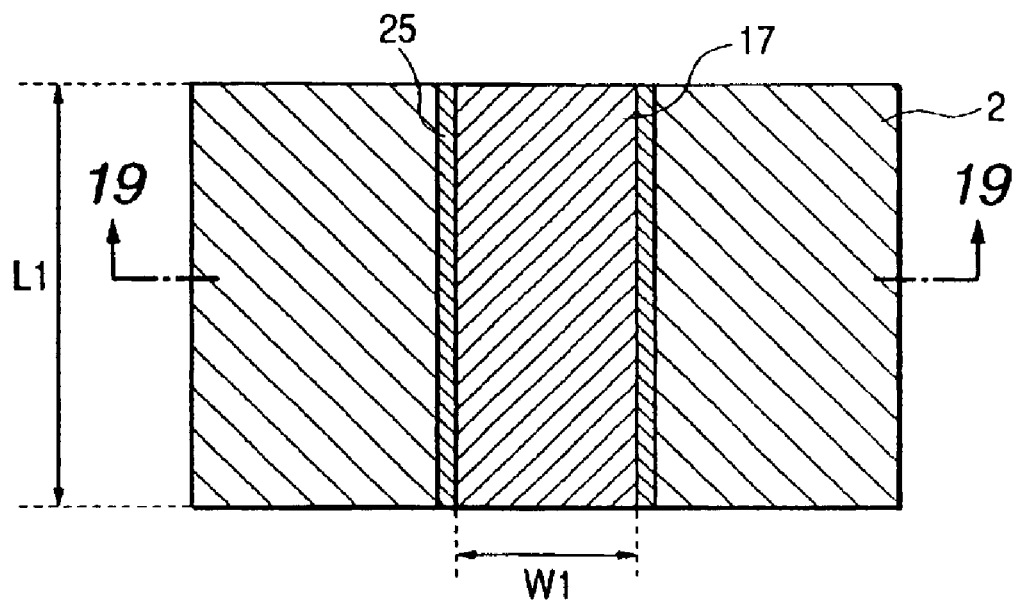
FIG. 18 is a plane view representing an electron emitting device according to Embodiment 4.
Figure 19:
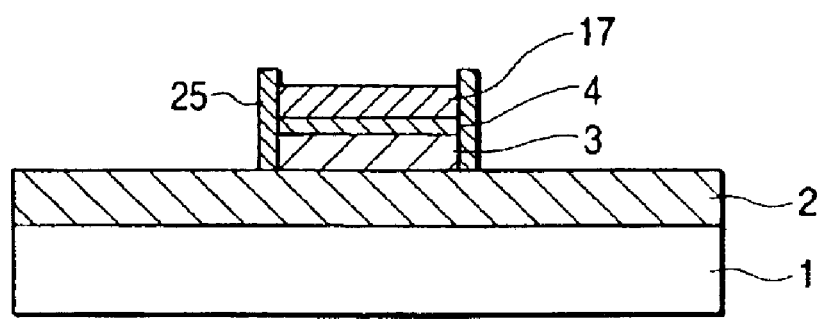
FIG. 19 is a cross sectional view along line 19—19 in FIG. 18, representing the electron emitting device according to Embodiment 4.

FIG. 18 is a plane view of an electron emitting device according to Embodiment 4 and FIG. 19 is a cross sectional view along line 19—19 in FIG. 18. Hereinafter, a method of manufacturing the device of this embodiment will be described through FIGS. 20A to 20E.

(Process 1)

Figure 20A:
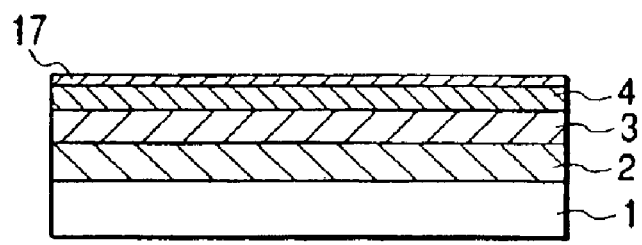
FIGS. 20A, 20B, 20C, 20D and 20E show one example of a method of manufacturing the electron emitting device according to Embodiment 4.

First, as shown in FIG. 20A, as Process 1 of Embodiment 1, Ta as the gate electrode 2 having a thickness of 300 nm, SiO$_2$ as the insulating layer 3 having a thickness of 100 nm, and Ta as the cathode electrode 4 having a thickness of 20 nm are deposited in this order. Subsequently, the electron emitting layer 17 of a diamond film having a thickness of about 100 nm is deposited on the cathode electrode 4 by a CVD method.

(Process 2)

Figure 20B:
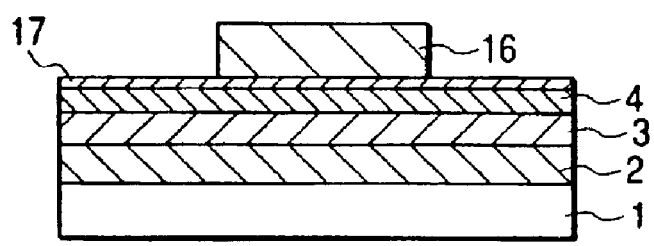

Next, as shown in FIG. 20B, as Process 2 of Embodiment 1, the mask pattern 16 is formed on the electron emitting layer 17 of the diamond film.

(Process 3)

Figure 20C:
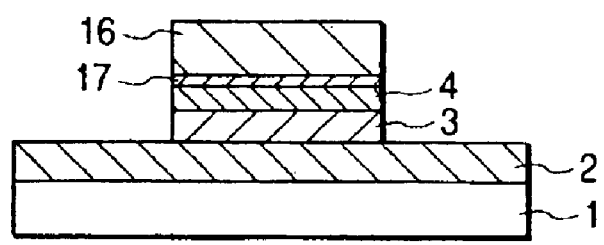

As shown in FIG. 20C, using the mask pattern 16 as a mask, the electron emitting layer 17 of the diamond film on the cathode electrode 4 is dry-etched with O$_2$, and the cathode electrode 4 of Ta and the insulating layer 3 are dry-etched with a CF$_4$ gas. This dry etching is stopped on the gate electrode 2. Thus, the lamination structure having the width W1 of 2 $\mu$m and the length L1 of 50 $\mu$m is formed.

(Process 4)

Figure 20D:
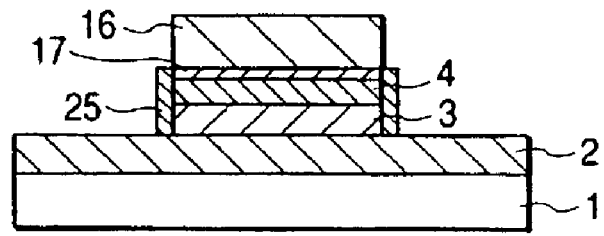

As shown in FIG. 20D, SiO$_2$ is obliquely evaporated as dielectrics 25 on the side surfaces of the lamination structure manufactured in the previous process.

(Process 5)

Figure 20E:
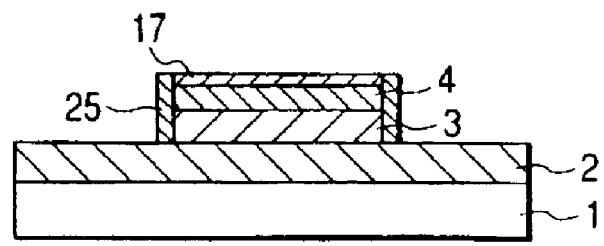

As shown in FIG. 20E, the mask pattern 16 used as the mask is entirely removed to complete the device.

When the device manufactured as described above is driven with Vg=30 V, Va=10 kV, D3=2 mm, since the dielectrics are located adjacent to the side surfaces of the electron emitting layer 17 and the cathode electrode 4, a reactive current produced between the cathode electrode 4 and the gate electrode 2 at driving can be further suppressed.

(Embodiment 5)

As Embodiment 5, the example that a concave portion is formed in a portion of the electron emitting layer 17 to provide a convex portion 17a and thus the electron emitting region is limited to the region of the convex portion 17a, is shown.

Figure 21:
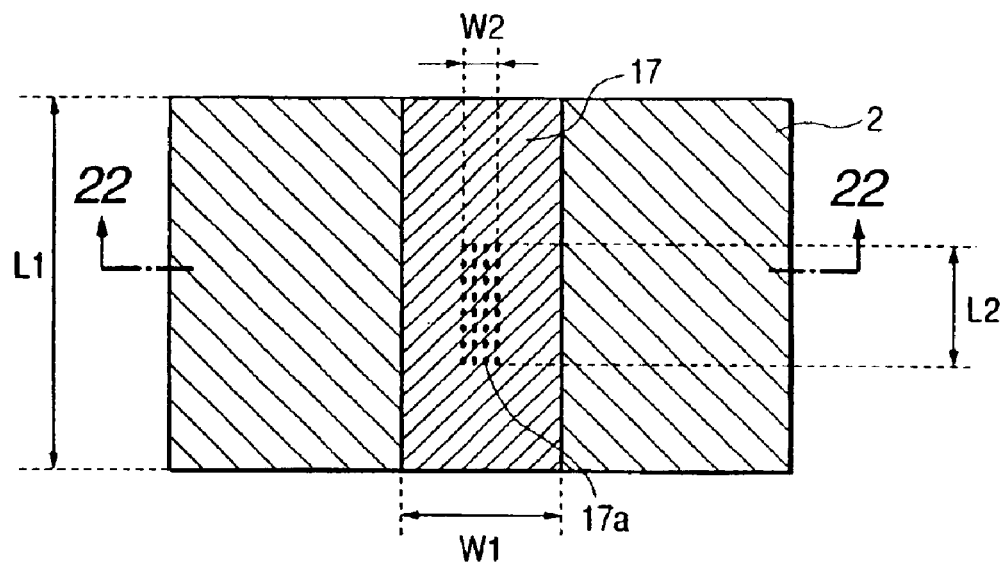
FIG. 21 is a plane view representing an electron emitting device according to Embodiment 5.
Figure 22:
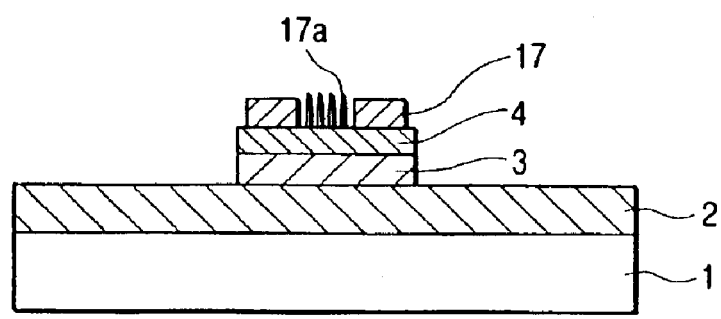
FIG. 22 is a cross sectional view along line 22—22 in FIG. 21, representing the electron emitting device according to Embodiment 5.

FIG. 21 is a plane view of an electron emitting device according to Embodiment 5, and FIG. 22 is a cross sectional view along line 22—22 in FIG. 21. Hereinafter, a method of manufacturing the device of this embodiment will be described through FIGS. 23A to 23D.

(Process 1)

Figure 23A:
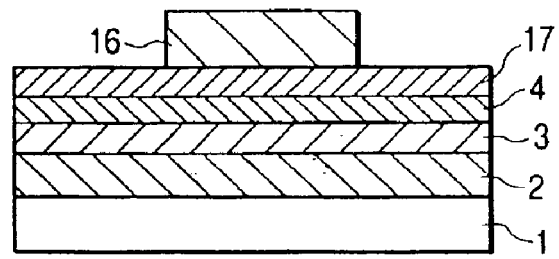
FIGS. 23A, 23B, 23C and 23D show one example of a method of manufacturing the electron emitting device according to Embodiment 5.

First, as shown in FIG. 23A, as Process 2 of Embodiment 1, Ta as the gate electrode 2 having a thickness of 300 nm, SiO$_2$ as the insulating layer 3 having a thickness of 100 nm, Ta as the cathode electrode 4 having a thickness of 20 nm, and a diamond film as the electron emitting layer 17 having a thickness of 100 nm are deposited on the substrate 1 in this order. Then, by a photolithography process, a spin coating of a positive type photoresist (AZ1500/by Clariant Corporation) is performed, and then a photomask pattern is exposed and developed to form the mask pattern 16 as shown in the drawing. Here, the width W of the pattern 16 is given by 4 $\mu$m.

(Process 2)

Figure 23B:
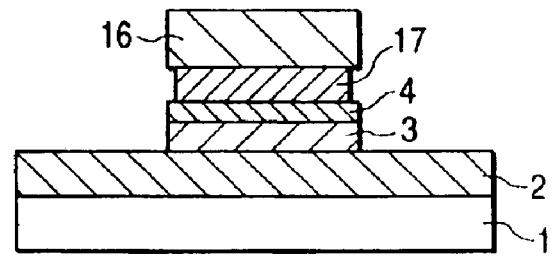

Next, as shown in FIG. 23B, using the same method as Process 3 of Embodiment 1, the electron emitting layer 17 is dry-etched with an O$_2$ gas, and the cathode electrode 4 and the insulating layer 3 are dry-etched with a CF$_4$ gas. This dry etching is stopped in the gate electrode 2. Thus, the lamination structure having the width W1 of 4 $\mu$m and the length L1 of 50 $\mu$m is formed.

(Process 3)

Figure 23C:
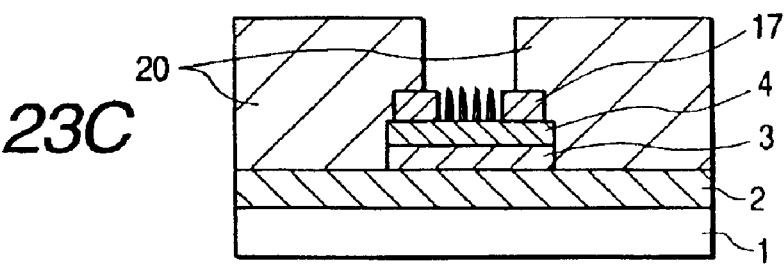

As shown in FIG. 23C, after the mask pattern 16 is peeled, a resist pattern 20 is patterned again to expose only a portion on the electron emitting layer 17 of the diamond film. Here, a width W2 of the exposed region is given by 2 $\mu$m and a length L2 thereof is given by 10 $\mu$m. The exposed region is dry-etched with an O$_2$ gas. By this dry etching, the surface of the diamond film is roughed to form a needle-shaped structure with a convex portion 17a having a diameter of 10 to 50 nm (several nm in the end) and a height of several tens of nm.

(Process 4)

Figure 23D:
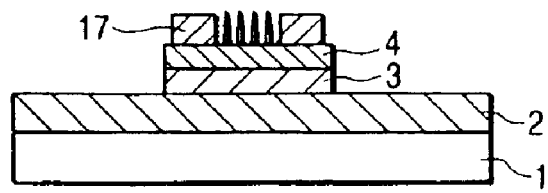

As shown in FIG. 23D, the resist pattern 20 is peeled, and finally the device having the width W1 of 4 $\mu$m, the device length L1 of 50 $\mu$m, the electron emitting portion width W2 of 2 $\mu$m, and the electron emitting portion length L2 of 10 $\mu$m, is manufactured.

When the device manufactured as described above is driven with Vg=15 V, Va=10 kV, H=2 mm, an electric field in the needle-shaped convex portion 17a on the electron emitting layer 17 of the diamond film is increased relatively to that on a flat portion by a shape effect, and thus electrons are emitted only from the needle-shaped convex portion 17a to a vacuum. Then, since a negative potential is formed around the needle-shaped convex portion 17a, the emitted electrons reach the anode without spreading the electron beam.

(Embodiment 6)

As Embodiment 6, the example that, in the lamination structure in that three cathode electrodes 4 and three insulating layers 3 are arranged in a stripe form on the gate electrode 2, electrons are emitted from only the electron emitting layer 17 as the electron emitting region on a central lower potential electrode 4, is shown.

Figure 24:
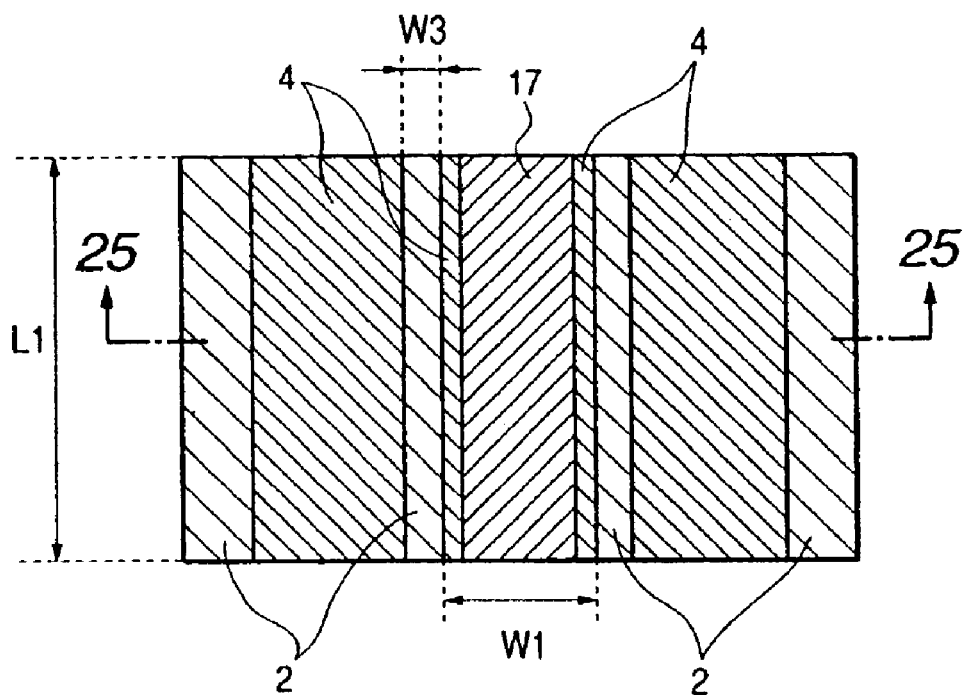
FIG. 24 is a plane view representing an electron emitting device according to Embodiment 6.
Figure 25:
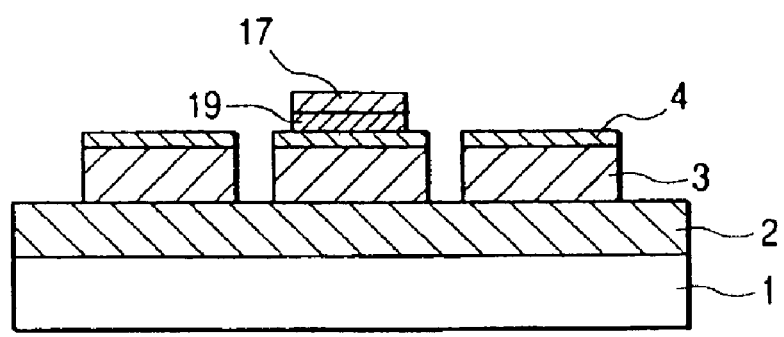
FIG. 25 is a cross sectional view along line 25—25 in FIG. 24, representing the electron emitting device according to Embodiment 6.

FIG. 24 is a plane view of an electron emitting device according to Embodiment 6, and FIG. 25 is a cross sectional view along line 25—25 in FIG. 24. Hereinafter, a method of manufacturing the device of this embodiment will be described through FIGS. 26A to 26D.

(Process 1)

Figure 26A:
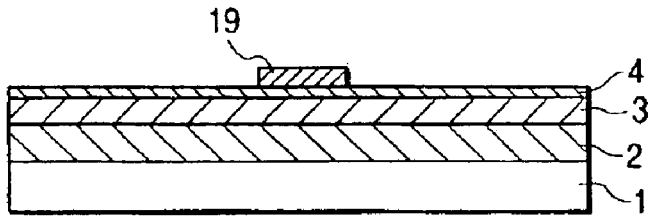
FIGS. 26A, 26B, 26C and 26D show one example of a method of manufacturing the electron emitting device according to Embodiment 6.

First, as shown in FIG. 26A, after the substrate 1 using quartz is sufficiently washed, Ta as the gate electrode 2 having a thickness of 300 nm, SiO$_2$ as the insulating layer 3 having a thickness of 100 nm, and Pt as the cathode electrode 4 having a thickness of 20 nm are deposited on the substrate 1 in this order by a sputtering method. After that, a mask (not shown) is formed by a photolithography and then Ti as a diamond nucleus producing layer 19 is formed on the cathode electrode 4.

(Process 2)

Figure 26B:
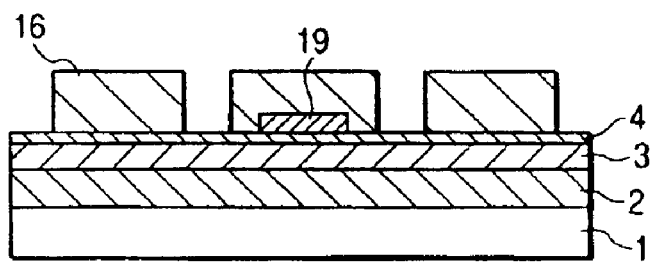

Next, as shown in FIG. 26B, in a photolithography process, a spin coating of a positive type photoresist (AZ1500/by Clariant Corporation) is performed, and then a photomask pattern is exposed and developed to form the mask pattern 16 as shown in the drawing.

(Process 3)

Figure 26C:
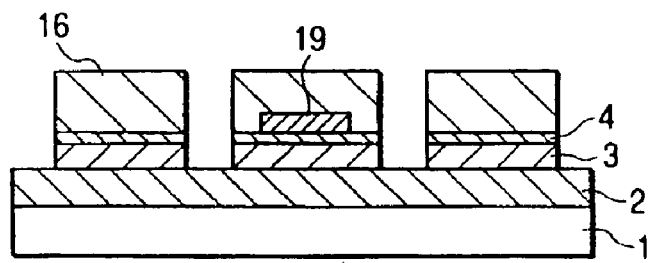

Next, as shown in FIG. 26C, using the mask pattern 16 as a mask, the cathode electrode 4 of Pt and the insulating layer 3 of SiO$_2$ are dry-etched with CF$_4$. This dry etching is stopped in the gate electrode 2. Thus, the lamination structure is formed. In this lamination structure, the width W1 is 4 $\mu$m, an interval W3 of parallel cathode electrodes 4 is 1 $\mu$m, the length L1 is 50 $\mu$m, and three cathode electrodes 4 and three insulating layers 3 are located in parallel on the gate electrode 2.

(Process 4)

Figure 26D:
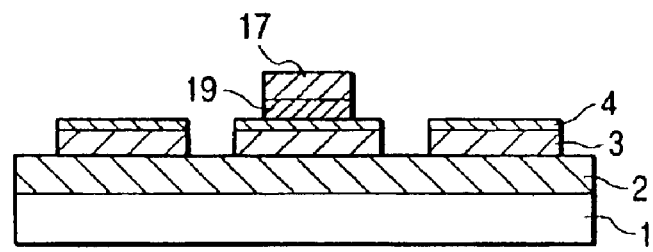

As shown in FIG. 26D, the electron emitting layer 17 of a diamond film is deposited on only the diamond nucleus producing layer 19 of Ti by a CVD method. Finally, the device constitution is formed. In this device constitution, three lamination structures each having the width W1 of 4 μm are located in parallel, the distance W3 between the lamination structures is 2 μm and the length L1 is 50 μm.

When the electron emitting device manufactured as described above is driven with Vg=30 V, Va=10 kV, D3=2 mm, electrons are emitted from only the electron emitting layer 17 of the diamond film on a central lower potential electrode 4 to a vacuum (Electrons are not emitted from the cathode electrode 4 of Pt by such an electric field strength). According to this embodiment, when the cathode electrodes 4 and the insulating layers 3 are located in parallel, a further uniform potential distribution is formed on the central cathode electrode 4 (corresponding to the electron emitting region) and a negative potential is formed in the cathode electrodes 4 located in parallel in both sides of the central cathode electrode 4. Thus, the emitted electrons reach the anode without spreading the electron beam.

(Embodiment 7)

As Embodiment 7, the example that, in the lamination structure in that three cathode electrodes 4 and three insulating layers 3 are arranged in a stripe form on the gate electrode 2, electrons are emitted from only the electron emitting layer 17 on the central cathode electrode 4 and a potential lower than that of the central cathode electrode are applied to the side cathode electrodes 4 located in both sides of the central cathode electrode, is shown.

(Process 1)

As Process 1 to Process 4 in Embodiment 6, the device constitution is formed. In this device constitution, three lamination structures of the cathode electrodes 4 and the insulating layers 3, each having the width W1 of 4 μm, are located in parallel, the distance W3 between the lamination structures is 2 μm, and the length L1 is 50 μm.

(Process 2)

On three cathode electrodes, the central cathode electrode and the side cathode electrodes are individually wired.

Here, the electron emitting device manufactured as described above is driven with Vf1=30 V, Vf2=60 V, Va=5 kV, H=2 mm. Note that Vf1 denotes a voltage between the central cathode electrode and the gate electrode 2 and Vf2 denotes a voltage between the side cathode electrodes and the gate electrode 2. By this driving, since a low potential is applied to the cathode electrodes 4 located in parallel, electrons emitted from a central electron emitting layer 17 reach the anode by converging the electron beam. According to this embodiment, the smaller beam diameter is obtained relatively to Embodiment 6.

(Embodiment 8)

An image forming apparatus is manufactured using the electron emitting device according to Embodiments 1 to 7. Here, as one example, the case where an image forming apparatus is manufactured using the electron emitting device according to Embodiment 1 will be described.

Figure 27:
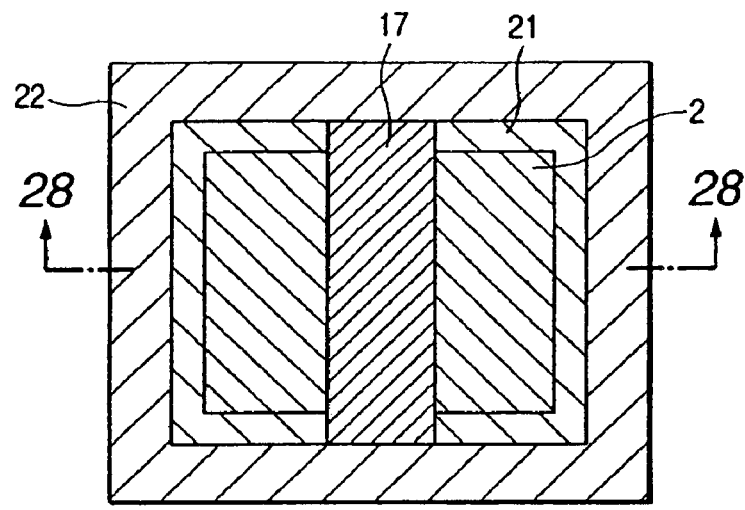
FIG. 27 is a plane view of an electron emitting device used in manufacturing of an image forming apparatus according to Embodiment 8.
Figure 28:
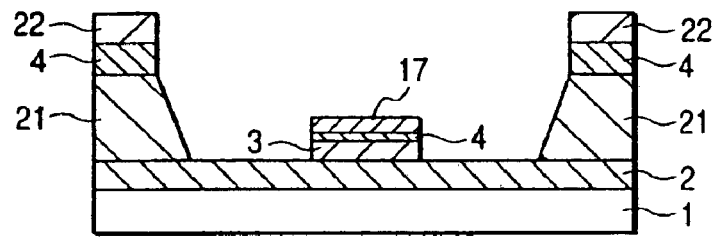
FIG. 28 is a cross sectional view along line 28—28 in FIG. 27, showing the electron emitting device used in manufacturing of the image forming apparatus according to Embodiment 8.
Figure 29:
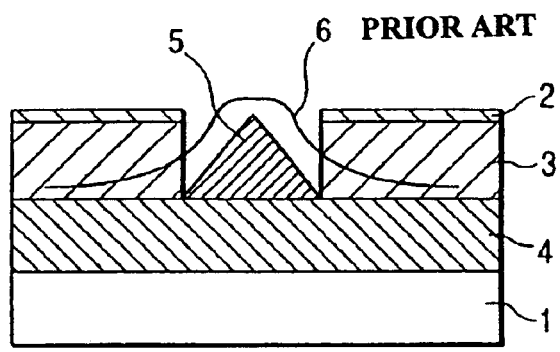
FIG. 29 is a cross sectional view schematically representing one example of a conventional Spindt type electron emitting device.
Figure 30A:
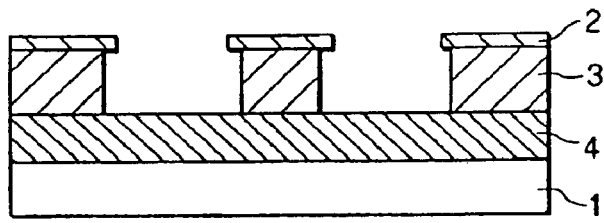
FIGS. 30A, 30B, 30C and 30D show one example of a method of manufacturing the conventional Spindt type electron emitting device.
Figure 30B:
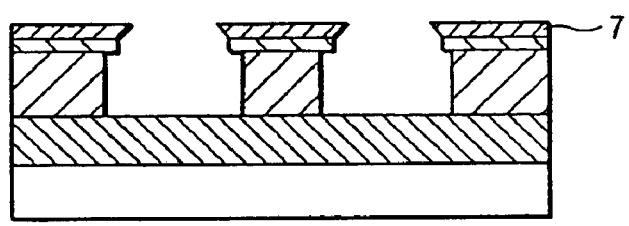
Figure 30C:
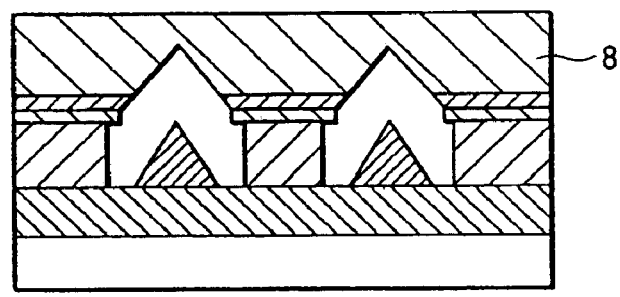
Figure 30D:
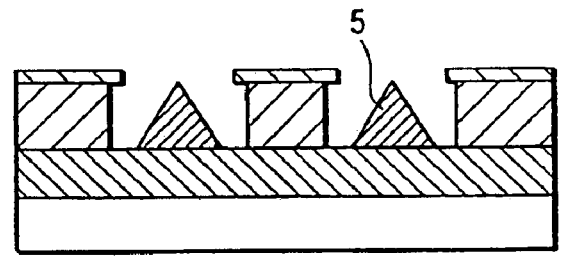
Figure 31:
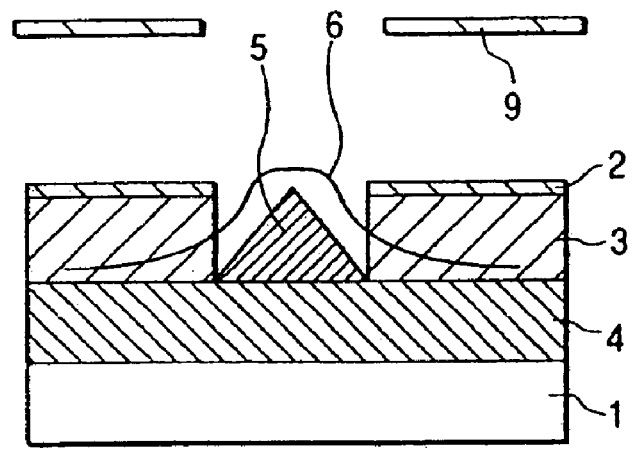
FIG. 31 is a cross sectional view schematically representing one example of a conventional Spindt type electron emitting device with a convergent electrode.
Figure 32:
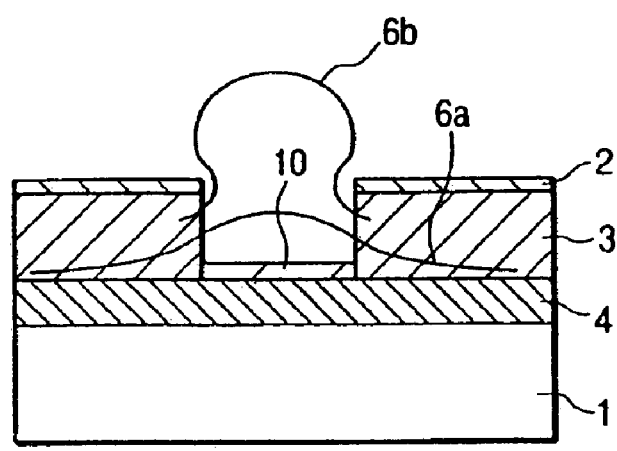
FIG. 32 is a cross sectional view schematically representing one example of a conventional electron emitting device.
Figure 33:
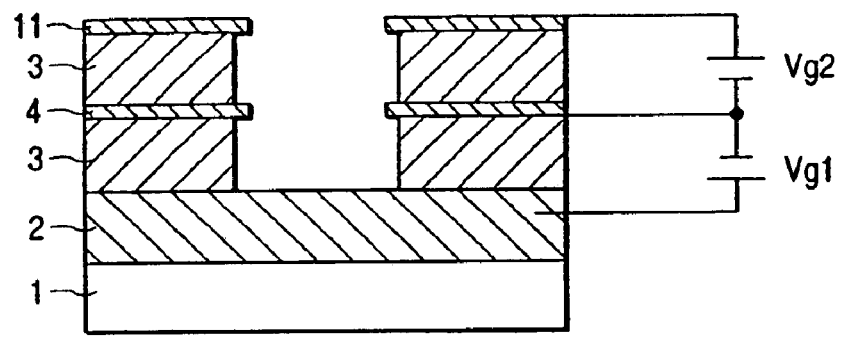
FIG. 33 is a cross sectional view schematically representing one example of a conventional electron emitting device.
Figure 34:
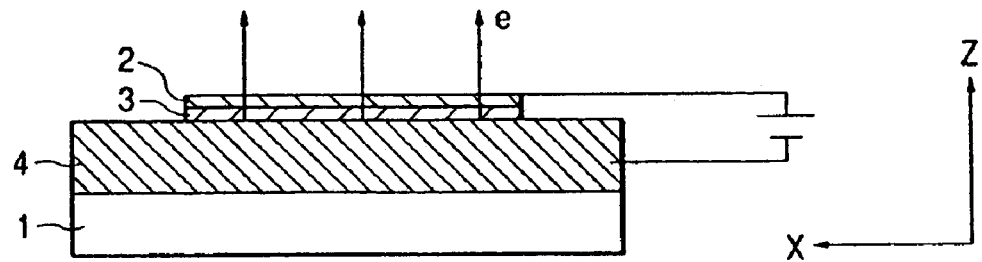
FIG. 34 is a cross sectional view schematically representing one example of a conventional MIM type electron emitting device.
Figure 35:
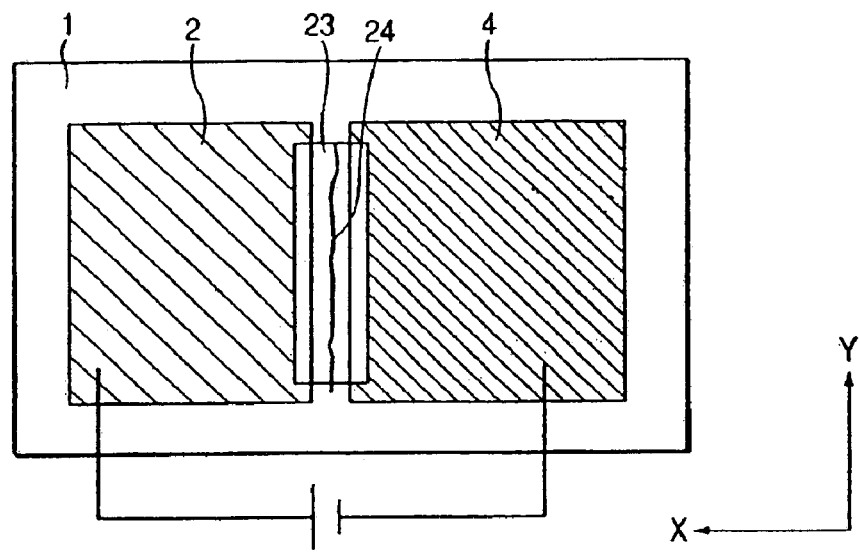
FIG. 35 is a plane view schematically representing one example of a conventional surface conduction type electron emitting device.
Figure 36:
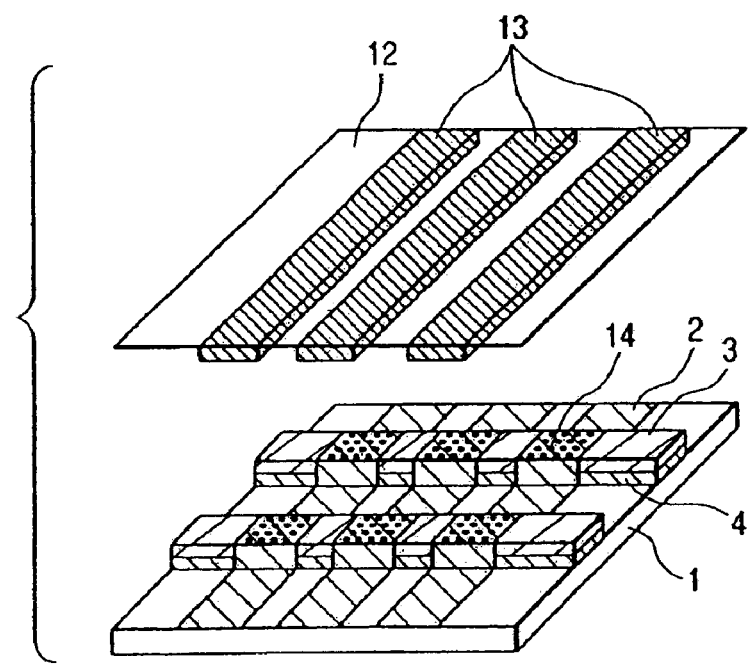
FIG. 36 is a schematic view representing one example of an image forming apparatus of a triode structure using the conventional electron emitting device.
Figure 37:
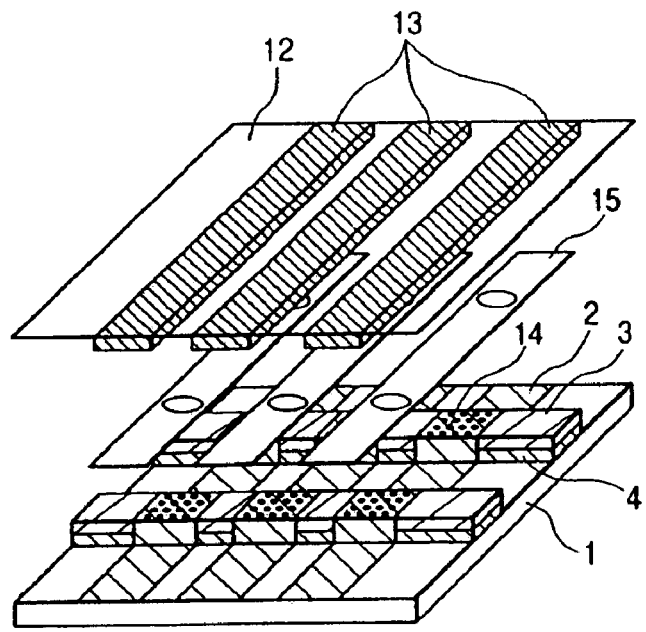
FIG. 37 is a schematic view representing one example of an image forming apparatus of a tetrode structure using the conventional electron emitting device.
Figure 38:
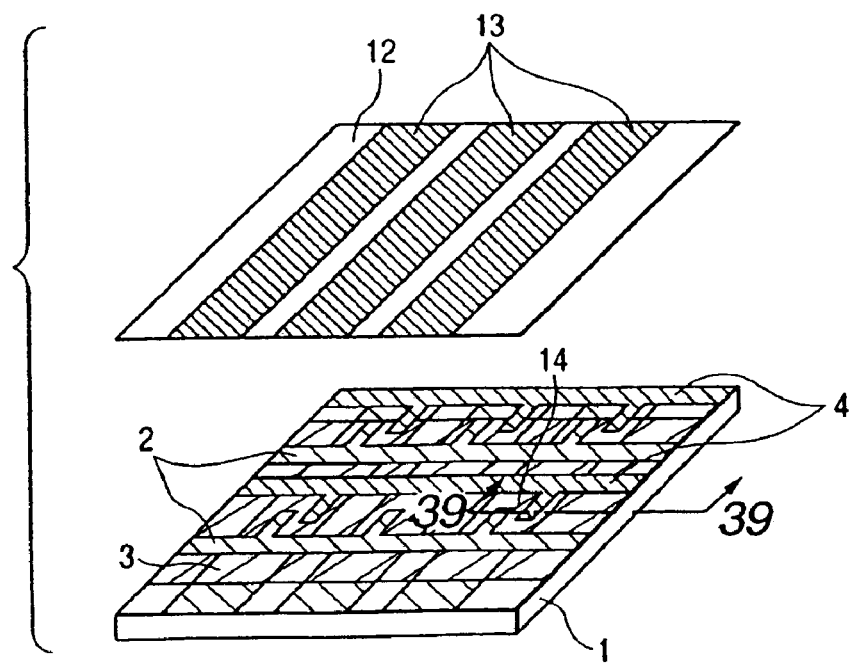
FIG. 38 is a schematic view representing one example of the image forming apparatus of the tetrode structure, in which modulation electrodes are arranged in the rear side of the electron emitting device.
Figure 39:
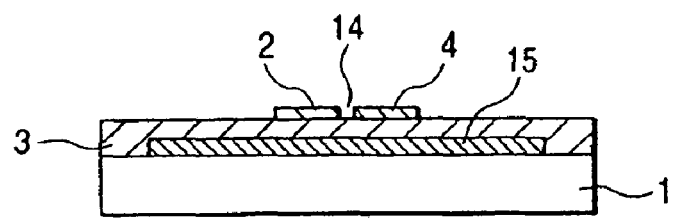
FIG. 39 is a schematic cross sectional view along line 39—39 in FIG. 38, representing one example of the image forming apparatus of the tetrode structure, in which modulation electrodes are arranged in the rear side of the electron emitting device.

FIG. 27 is a structural view of the device of this embodiment when it is viewed from the above, and FIG. 28 is a cross sectional view taken along with a line 28—28 in FIG. 27. According to the electron emitting device in this case, as shown in drawings, an insulating layer in a region except for the gate electrode related to the electron emitting is designed thick with 1 μm as an insulating layer 21 to decrease a parasitic capacitance, and thus a signal delay produced during a matrix driving is prevented. Also, a wiring 22 is deposited on the cathode electrode 4 to prevent the occurrence of a voltage drop.

The devices of Embodiment 1 are arranged in an MTX (matrix) form of 10×10. As shown in FIG. 9, a wiring in an X-side is connected with the gate electrode 2 and a wiring in a Y-side is connected with the lower potential electrode 4. The devices are arranged with pitches of 150 μm in a transverse direction and 300 μm in a longitudinal direction. A phosphor is located in the upper part of the device. As a result, the image forming apparatus which can be matrix-driven due to a reduction effect of a capacitance component and has a high definition can be formed.

(Embodiment 9)

FIG. 40 is a plane view of an electron emitting device manufactured according to this embodiment, FIG. 41 shows one example of a cross sectional view, and FIGS. 44A to 44D show one example of a method of manufacturing the electron emitting device of the present invention. Hereinafter, a process for manufacturing the electron emitting device of this embodiment will be described in details.

(Process 1)

First, as shown in FIG. 44A, after the substrate 1 using quartz is sufficiently washed, Ta as the gate electrode 2 having a thickness of 300 nm, $SiO_2$ as the insulating layer 3 having a thickness of 100 nm, and Ti as the cathode electrode 4 having a thickness of 50 nm are deposited in this order by a sputtering method. Subsequently, the electron emitting layer 17 of a diamond film having a thickness of about 100 nm is deposited on the cathode electrode 4 by a CVD method. As a reactive gas, a mixture gas of $CH_4$ and $H_2$ is used. Further, Al as the anodizable layer 18 is deposited at a thickness of 100 nm on a portion of the electron emitting layer 17 of the diamond film. With respect to a deposition region of the anodizable layer 18, W1=4 μm and L1=40 μm are given in FIG. 40.

Next, by a photolithography, a spin coating of a positive type photoresist (AZ1500/by Clariant Corporation) is performed and then a photomask pattern is exposed and developed. Thus, the mask pattern 19 is formed so as to expose the anodizable layer 18.

(Process 2)

Next, as shown in FIG. 44B, an anodization is performed for the exposed anodizable layer 18. Using an aqueous solution of oxalic acid (30 g/l) as an electrolytic solution, a Pt electrode as the cathode for electrolysis, and the anodizable layer 18 as the anode, an electrolysis is performed. A constant voltage of 45 V is applied between the cathode and the anode.

After the anodization, the resultant structure is immersed into an aqueous solution of phosphoric acid and sufficiently washed, and then dried in a vacuum.

By the above anodization process, the holes 16 which penetrate the anodizable layer 18 are formed in the exposed portion of the anodizable layer 18.

(Process 3)

Next, as shown in FIG. 44C, after the mask pattern 19 is peeled, using the anodizable layer 18 penetrated by the holes 16 as a mask, the electron emitting layer 17 made of a diamond film is dry-etched with an $O_2$ gas. Also, the cathode electrode 4 and the insulating layer 3 are dry-etched with a $CF_4$ gas. This dry etching is stopped in the gate electrode 2. Thus, a lamination structure of the electron emitting layer 17 made of the diamond film, the cathode electrode 4, and the insulating layer 3, having the width W1 of 4 μm and the length L1 of 40 μm, is formed. Simultaneously, the holes 16 penetrate the electron emitting layer 17, the cathode electrode 4, and the insulating layer 3.

(Process 4)

As shown in FIG. 44D, the anodizable layer 18 used as the mask is entirely removed to complete the device.

The device manufactured as described above is driven with the arrangement of FIG. 42. Assume that, as the driving voltages, Vg=30 V and Va=10 kV, and the distance D3 between the electron emitting device and the anode 12 is 2 mm. An electrode to which a phosphor is applied is used as the anode 12. Then, a size of the electron beam is observed. Here, the size of the electron beam is given as that corresponding to a range of a peak intensity of the light-emitted phosphor to 10% of its intensity. As a result, the diameter of the beam becomes 100 µm/200 µm (x/y).

(Embodiment 10)

As Embodiment 10, the example that, the holes 16 having a slightly larger diameter than that of the holes 16 formed in the insulating layer 3 and the cathode electrode 4, are formed in the electron emitting layer 17 to further remove an occurrence factor of a reactive current, is shown.

Figure 45:
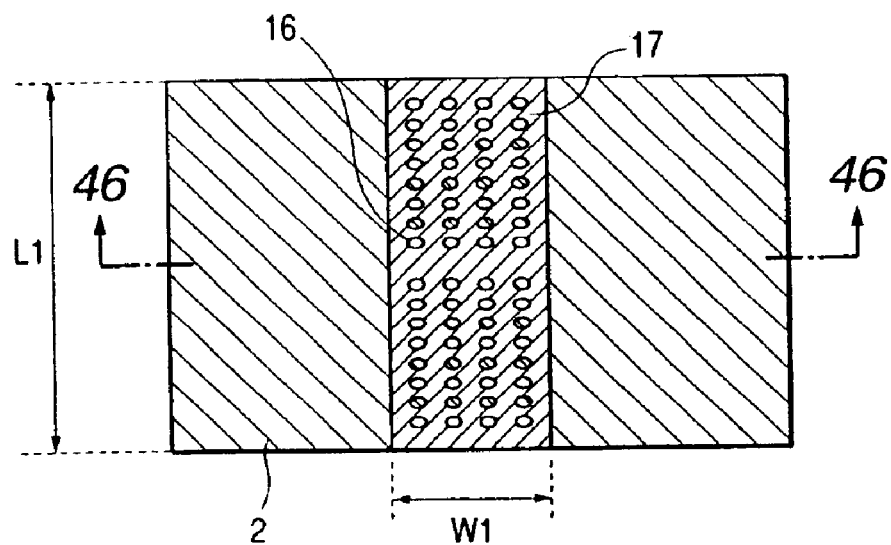
FIG. 45 is a schematic plane view of another configuration of an electron emitting device according to another embodiment of the present invention.
Figure 46:
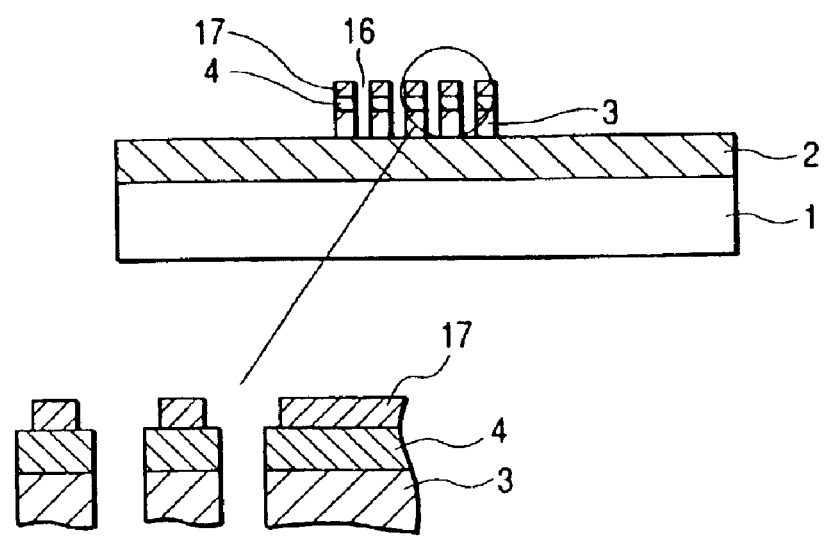
FIG. 46 is a schematic cross sectional view along line 46—46 in FIG. 45, showing the electron emitting device according to another embodiment of the present invention.

FIG. 45 is a plane view of an electron emitting device according to Embodiment 10, FIG. 46 shows one example of a cross sectional view, and FIGS. 47A to 47E show one example of a method of manufacturing the electron emitting device of the present invention. Hereinafter, a method of manufacturing the device of this embodiment will be described through FIGS. 47A to 47E.

(Process 1)

Figure 47A:
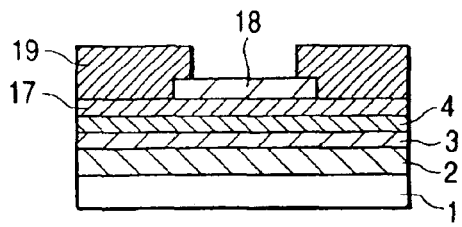
FIGS. 47A, 47B, 47C, 47D and 47E are schematic views of a method of manufacturing the electron emitting device according to another embodiment of the present invention.

First, as shown in FIG. 47A, as Process 1 of Embodiment 9, Ta as the gate electrode 2 having a thickness of 300 nm, $SiO_2$ as the insulating layer 3 having a thickness of 100 nm, Ti as the cathode electrode 4 having a thickness of 50 nm, and a diamond film as the electron emitting layer 17 having a thickness of 100 nm are deposited in this order by a sputtering method. Then, Al as the anodizable layer 18 having a thickness of 100 nm is deposited on a portion of the electron emitting layer 17 made of the diamond film. With respect to a deposition region of the anodizable layer 18, W1=4 µm and L1=40 µm are given in FIG. 46.

Next, by a photolithography, a spin coating of a positive type photoresist (AZ1500/by Clariant Corporation) is performed and then a photomask pattern is exposed and developed to form the mask pattern 19.

(Process 2)

Figure 47B:
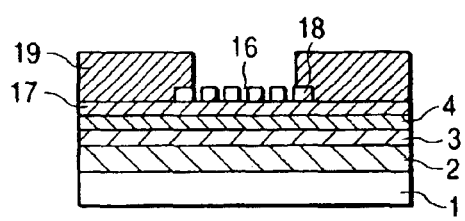

Next, as shown in FIG. 47B, as Process 2 of Embodiment 9, an anodization is performed for the exposed anodizable layer 18. Thus, the holes 16 which penetrate the anodizable layer 18 are formed in the exposed portion of the anodizable layer 18.

(Process 3)

Figure 47C:
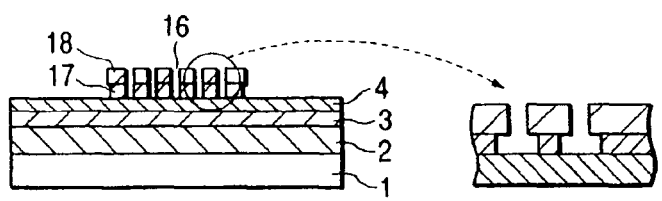

Next, as shown in FIG. 47C, after the mask pattern 19 is peeled, using the anodizable layer 18 penetrated by the holes 16 as a mask, the electron emitting layer 17 made of the diamond film is dry-etched using an $O_2$ gas with a higher $O_2$ gas pressure than that in Embodiment 9. Thus, the holes 16 having a slightly larger diameter than in an anodization hole mask of the anodizable layer 18 penetrate the electron emitting layer 17 made of the diamond film.

(Process 4)

Figure 47D:
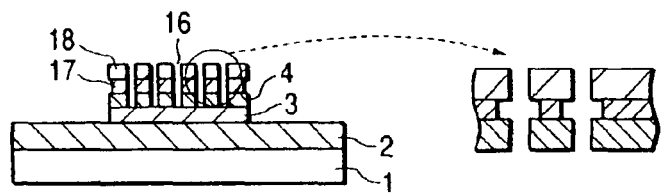

Subsequently, as shown in FIG. 47D, as in Embodiment 9, using the anodization hole of the anodizable layer 18 as a mask, the cathode electrode 4 and the insulating layer 3 are dry-etched with a $CF_4$ gas. Thus, a lamination structure is formed. Also, the holes 16 which penetrate the cathode electrode 4 and the insulating layer 3 are formed.

(Process 5)

Figure 47E:
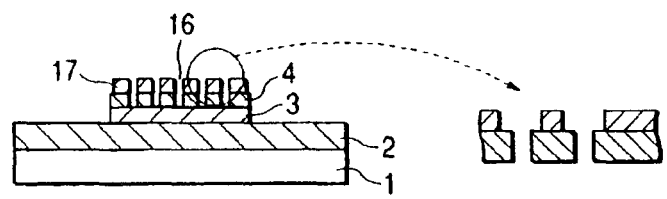

As shown in FIG. 47E, the anodizable layer 18 used as the mask is entirely removed to complete the device.

When the electron emitting device manufactured as described above is driven with Vg=30 V, Va=10 kV, D3=2 mm, electrons are emitted to a vacuum from the electron emitting layer 17 made of the diamond film on the cathode electrode 4. Since, in opening portions of the holes 16, the side surfaces of the electron emitting layer 17 made of the diamond film are located inside those of the cathode electrode 4 and then the electron emitting layer 17 is provided in a region inside the insulating layer 3 and the cathode electrode 4, almost all emitted electrons move toward the anode. Therefore, the emitting current (Ie) is obtained with higher efficiency than that in Embodiment 9.

(Embodiment 11)

In this embodiment, the electron emitting device with the structure shown in FIG. 7A is manufactured. This device has the same structure as in Embodiment 2, except that different material is used for the electron emitting layer 17.

The electron emitting layer 17 of this embodiment is formed using a layer containing mainly a carbon nanotube. The carbon nanotube is formed so as to align it along a direction substantially vertical to the surface of the substrate 1 (the surface of the gate electrode 2), from the cathode electrode 4.

Concretely, the gate electrode 2 made of Ta having a thickness of 200 nm, the insulating layer 3 made of $SiO_2$, and the cathode electrode 4 made of Ta having a thickness of 15 nm are laminated on the substrate 1 and then the pattern as shown in FIG. 7A is processed by etching to form a structure except for the electron emitting layer 17.

Next, a plurality of Fe particles are disposed on the cathode electrode 4 and then heated in a methane atmosphere to dispose the carbon nanotube with a high density on the cathode electrode.

In this embodiment, the Fe particles are disposed inside ends (side surfaces or a circumference portion) of the cathode electrode 4. Thus, as shown in FIG. 7A, the electron emitting layer 17 containing mainly the carbon nanotube can be disposed inside ends (side surfaces or a circumference portion) of the cathode electrode 4.

When the device manufactured in this embodiment is driven as shown in FIG. 3, electrons can be emitted with a low voltage. Also, a reactive current is hardly produced, and thus very stable electron emitting characteristic can be obtained.

(Embodiment 12)

In this embodiment, an image forming apparatus is manufactured using the electron emitting device of Embodiment 9.

Figure 48:
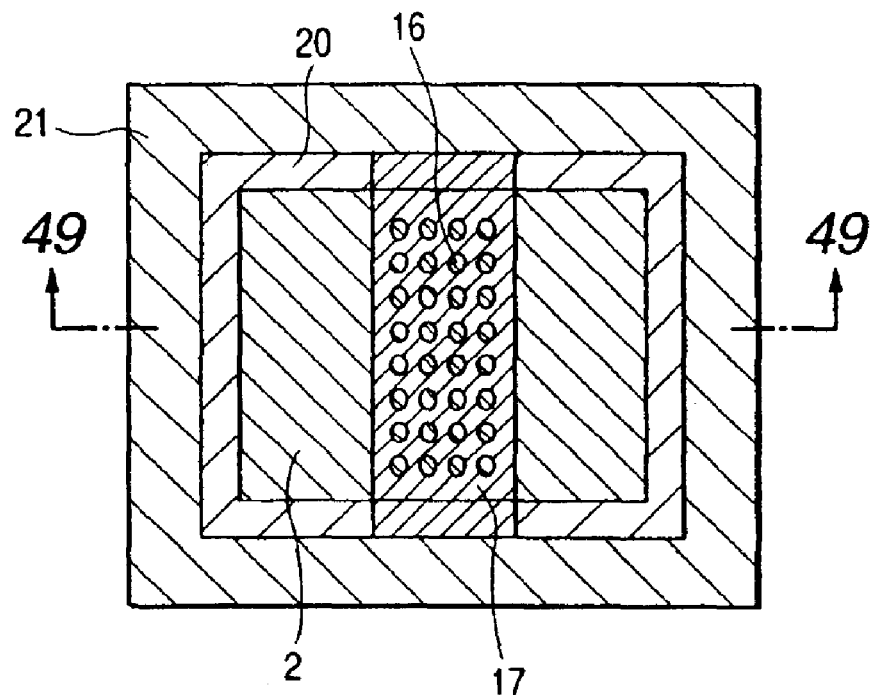
FIG. 48 is a schematic plane view of another configuration of an electron emitting device according to another embodiment of the present invention.
Figure 49:
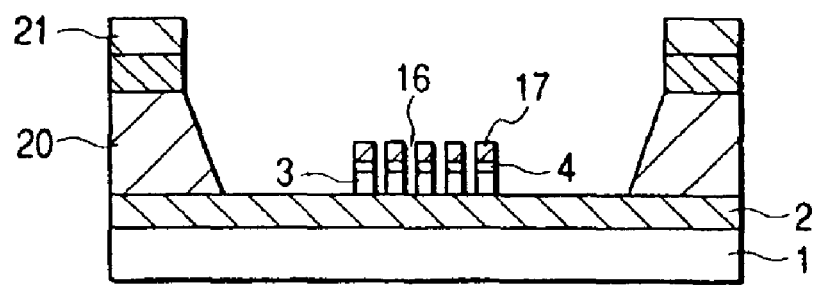
FIG. 49 is a schematic cross sectional view along line 49—49 in FIG. 48, showing the electron emitting device according to another embodiment of the present invention.

FIG. 48 is a structural view of the device of this embodiment when it is viewed from the above and FIG. 49 is a cross sectional view along a line 49—49 in FIG. 48. According to the electron emitting device in this case, as shown in drawings, an insulating layer in a region other than the gate electrode 2 related to the electron emitting is designed thick with a thickness of 1 µm as the insulating layer 21 to decrease a parasitic capacitance, and thus a signal delay produced during a matrix driving is prevented. Also, the wiring 22 is deposited on the cathode electrode 4 to prevent the occurrence of a voltage drop.

In this embodiment, the devices of Embodiment 9 are arranged in a matrix form (10 in a longitudinal direction and 10 in a transverse direction, thus 100 in total). As shown in FIG. 6, a wiring in an X-side is connected with the gate electrode 2 and a wiring in a Y-side is connected with the cathode electrode 4. The devices are arranged with pitches of 150 µm in a transverse direction and 300 µm in a longitudinal direction. A phosphor is located over the device. As a result, the image forming apparatus which can be matrix-driven by a reduction effect of a capacitance component and has a high definition can be formed.

As described above, according to the present invention, the electron emitting device in which the diameter of the electron beam is small, the electron emitting area is large, the electron emitting can be made with a low voltage and high efficiency, and the manufacturing process is easy, can be provided.

Also, when such an electron emitting device is applied to the electron source or the image forming apparatus, the electron source or the image forming apparatus with a superior performance can be realized.

What is claimed is:

1. A method of manufacturing an electron-emitting device, comprising the steps of:
   (A) providing a substrate having a gate electrode;
   (B) forming an insulating layer on a surface of the gate electrode;
   (C) forming a cathode electrode on a surface of the insulating layer, wherein a width of the cathode electrode is shorter than that of the gate electrode;
   (D) after the forming of the cathode electrode on the surface of the insulating layer, arranging a plurality of carbon fibers on a surface of the cathode electrode; and
   (E) connecting a voltage source, for causing an electron emission from at least some of the plurality of carbon fibers arranged on at least part of the surface of the cathode electrode which is located in a region between both ends defining the width of the gate electrode, to the cathode electrode and the gate electrode, so that a potential of the gate electrode is higher than that of the cathode electrode.

2. The method according to claim 1, wherein step (D) further comprises:
   a step of disposing a plurality of catalytic particles on the surface of the cathode electrode; and
   a step of generating the plurality of carbon fibers on the surface of the cathode electrode, via using a CVD method.

3. The method according to claim 2, wherein the catalytic particles comprise at least one material selected from the group consisting of Fe, Ni and Pd.

4. The method according to claim 1, wherein the carbon fibers comprise at least one element selected from the group consisting of a carbon nanotube, a graphite nanofiber, and a diamond fiber.

5. The method according to claim 1, wherein
   the plurality of carbon fibers are disposed on the surface of the cathode electrode, in an inside area between both ends defining the width of the cathode electrode.

6. The method according to claim 1, wherein
   the cathode electrode includes one or more elements selected from the group consisting of Be, Mg, Ti, Zr, Hf, V, Nb, Ta, Mo, W, Al, Cu, Ni, Cr, Au, Pt and Pd.

7. The method according to claim 1, wherein
   the gate electrode includes one or more elements selected from the group consisting of Be, Mg, Ti, Zr, Hf, V, Nb, Ta, Mo, W, Al, Cu, Ni, Cr, Au, Pt and Pd.

8. The method according to claim 1, wherein
   the insulating layer includes one or more elements selected from the group consisting of $SiO_2$, $SiN$, $Al_2O_3$, $CaF$, and undoped diamond.

9. A method of manufacturing an electron source, comprising steps of:
   forming a plurality of electron-emitting devices on a substrate, each electron-emitting device being formed according to a method comprising the steps of
      (A) providing a gate electrode on the substrate,
      (B) forming an insulating layer on a surface of the gate electrode,
      (C) forming a cathode electrode on a surface of the insulating layer, wherein a width of the cathode electrode is shorter than that of the gate electrode, and
      (D) after the forming of the cathode electrode on the surface of the insulating layer, arranging a plurality of carbon fibers on a surface of the cathode electrode;
   connecting a voltage source to the gate electrode and the cathode electrode of at least one of the electron-emitting devices, so that a potential of the gate electrode is higher than that of the cathode electrode, for causing an electron emission from at least some of the plurality of carbon fibers arranged on at least part of the surface of the cathode electrode which is located in a region between both ends defining the width of the gate electrode; and
   forming a plurality of X-directional wirings and a plurality of Y-directional wirings, wherein
   each of the electron-emitting devices is connected to a corresponding one of the X-directional wirings and to a corresponding one of the Y-directional wirings.

10. The method according to claim 9, further comprising
    a step of connecting, to the plurality of X-directional wirings, a scan signal applier for applying a scan signal, and connecting to the plurality of Y-directional wirings, a modulation signal applier for applying a modulation signal,
    wherein the gate electrode of each electron-emitting device is connected to a corresponding X-directional wiring, while the cathode electrode of the electron-emitting device is connected to a corresponding Y-directional wiring.

11. A method of manufacturing an image display apparatus having an electron source, a phosphor film, and an anode for irradiating the phosphor film with an electron emitted from the electron source, comprising a step of arranging the anode on a side of the phosphor film facing the electron source, wherein the electron source is manufactured according to the method of claim 9 or 10.

* * * * *

UNITED STATES PATENT AND TRADEMARK OFFICE
CERTIFICATE OF CORRECTION

PATENT NO. : 6,933,664 B2
APPLICATION NO. : 10/464760
DATED : August 23, 2005
INVENTOR(S) : Shin Kitamura et al.

It is certified that error appears in the above-identified patent and that said Letters Patent is hereby corrected as shown below:

ON TITLE PAGE ITEM [56] REFERENCES CITED

U.S. Patent Documents, "5,382,867   A   1/1995   Yuji et al."
should read --5,382,867   A   1/1995       Maruo et al.--.

ON TITLE PAGE ITEM [56] REFERENCES CITED

U.S. Patent Documents, "5,773,921   A   6/1998   Keesmann et al."
should read --5,773,921   A       6/1998       Keesman et al.--.

ON TITLE PAGE ITEM [56] REFERENCES CITED

U.S. Patent Documents, "2002/0006232   A1   1/2002   Choi et al."
should read --2002/0006232   A1   7/2001   Choi et al.--.

ON TITLE PAGE ITEM [56] REFERENCES CITED

U.S. Patent Documents, "2002/0136896   A1   9/2002   Takikawa et al."
should read --2002/0136896   A1   9/2000       Takikawa et al.--.

ON TITLE PAGE ITEM [56] REFERENCES CITED

Other Publications, (in A.G. Rinzler et al.), "Sci nce," should read --Science--.

ON TITLE PAGE ITEM [56] REFERENCES CITED

Other Publications, (in H. Dai et al.), "Disproportionati n  f"
should read --Disproportionation of--.

UNITED STATES PATENT AND TRADEMARK OFFICE
CERTIFICATE OF CORRECTION

PATENT NO.        : 6,933,664 B2
APPLICATION NO. : 10/464760
DATED             : August 23, 2005
INVENTOR(S)       : Shin Kitamura et al.

It is certified that error appears in the above-identified patent and that said Letters Patent is hereby corrected as shown below:

COLUMN 1

Line 24, "Advance in Electron" should read --Advances in Electronics and Electron--;
Line 26, "thin-film field emission cathodes with molybdenum cones" should read --Thin-film Field Emission Cathodes with Molybdenum Cones--;
Line 33, "Fluctuation-free electron emission from non-formed metal" should read --Fluctuation-Free Electron Emission From Non-Formed Metal--;
Line 34, "insulator-metal (MIM) cathodes fabricated by low current" should read --Insulator-Metal (MIM) Cathodes Fabricated by Low Current--;
Line 35, "anodic oxidation" should read --Anodic Oxidation--; and "Phys. Vol. 32 (1993) pp." should read --Phys., 32, L1695 (1993)--;
Line 36, "L1695" should be deleted;
Line 41, "Eng. Electron" should read --Eng. and Electronic--;
Line 43, "Dittmer." should read --Dittmer,--;
Line 50, "Fonstad:" should read --Fonstad,--;
Line 58, "minuteness" should read --resolution--; and
Line 63, "spindt" should read --Spindt--.

COLUMN 2

Line 5, "emitting electron" should read --emitted electrons--;
Line 29, "progress" should read --process--;
Line 39, "with the state that" should read --and--;
Line 42, "produced" should read --produced and left--; and "off, there is a case where" should read --off process,--;
Line 43, "shirt" should read --short--;
Line 44, "shirt" should read --short--;
Line 45, "rounding" should read --roundings--;
Line 50, "as the" should be deleted;
Line 56, "these" should read --there--; and
Line 60, "to" should read --in--.

UNITED STATES PATENT AND TRADEMARK OFFICE
CERTIFICATE OF CORRECTION

PATENT NO. : 6,933,664 B2
APPLICATION NO. : 10/464760
DATED : August 23, 2005
INVENTOR(S) : Shin Kitamura et al.

It is certified that error appears in the above-identified patent and that said Letters Patent is hereby corrected as shown below:

COLUMN 3

Line 1, "an amount" should read --the amount--;
Line 2, "an amount" should read --the amount--;
Line 7, "there is one that" should be deleted;
Line 12, "further" should read --more--;
Line 13, "a" should be deleted;
Line 16, "locating the" should read --using a--;
Line 25, "as" should read --as is done--;
Line 28, "spindt" should read --Spindt--;
Line 39, "an amount of electron" should read --the amount of electrons--;
Line 46, "electron" should read --electrons--; and
Line 67, "until here are" should read --so far have been--.

COLUMN 4

Line 9, "are" should read --is--;
Line 16, "electrodes" should read --electrode--;
Line 17, "electron" should read --and electron--;
Line 25, "is" should read --are--; and "deices" should read --devices--;
Line 35, "in a rear side" should read --sideways--;
Line 41, "a" should read --the--;
Line 42, "an" should read --the--; and
Line 44, "a" should read --the--.

COLUMN 5

Line 23, "in" should read --to--;
Line 31, "Then, a" should read --A--; and "structure" should read --structure is obtained--;
Line 34, "this order, is obtained," should read --that order--;
Line 35, "the" should read --, therefore, the--;
Line 41, "the" should read --an--; and
Line 63, "further" should be deleted.

UNITED STATES PATENT AND TRADEMARK OFFICE
CERTIFICATE OF CORRECTION

| | | |
|---|---|---|
| PATENT NO. | : 6,933,664 B2 | |
| APPLICATION NO. | : 10/464760 | |
| DATED | : August 23, 2005 | |
| INVENTOR(S) | : Shin Kitamura et al. | |

It is certified that error appears in the above-identified patent and that said Letters Patent is hereby corrected as shown below:

COLUMN 6

Line 20, "cross sectional" should read --cross-sectional--;
Line 27, "cross sectional" should read --cross-sectional--;
Line 35, "cross sectional" should read --cross-sectional--;
Line 43, "cross sectional" should read --cross-sectional--;
Line 52, "cross sectional" should read --cross-sectional--;
Line 56, "cross sectional" should read --cross-sectional--; and
Line 62, "cross sectional" should read --cross-sectional--.

COLUMN 7

Line 1, "cross sectional" should read --cross-sectional--;
Line 3, "cross sectional" should read --cross-sectional--;
Line 5, "cross sectional" should read --cross-sectional--;
Line 21, "cross sectional" should read --cross-sectional--;
Line 29, "cross sectional" should read --cross-sectional--;
Line 35, "cross section" should read --cross-section--;
Line 44, "cross sectional" should read --cross-sectional--;
Line 53, "cross sectional" should read --cross-sectional--;
Line 62, "a" should read --the--;
Line 64, "constitution" should read --the--; and
Line 66, "fied" should read --fic--.

COLUMN 8

Line 13, "cross sectional" should read --cross-sectional--;
Line 32, "supplying" should read --supply--;
Line 34, "Effective" should read --The effective--;
Line 41, "perform also a function" should read --also perform--;
Line 42, "is performs also" should read --also performs--;
Line 43, "there is the case where" should be deleted;
Line 60, "in" should read --in the--;
Line 61, "emitting" should read --emitting device--; and
Line 62, "in electron emitting" should read --in the electron emitting device--.

UNITED STATES PATENT AND TRADEMARK OFFICE
CERTIFICATE OF CORRECTION

PATENT NO. : 6,933,664 B2  
APPLICATION NO. : 10/464760  
DATED : August 23, 2005  
INVENTOR(S) : Shin Kitamura et al.

It is certified that error appears in the above-identified patent and that said Letters Patent is hereby corrected as shown below:

COLUMN 9

Line 16, "use" should read --usable--;  
Line 28, "in" should read --on--;  
Line 37, "in" should read --on--; and  
Line 53, "wards," should read --words,--.

COLUMN 10

Line 6, "further made small" should read --made smaller--;  
Line 11, "cross sectional" should read --cross-sectional--;  
Line 28, "supplying" should read --supply--;  
Line 29, "other" should read --another--;  
Line 30, "Effec-" should read --The effec- --;  
Line 37, "the case" should read --that case--;  
Line 38, "a function" should read --and functions--;  
Line 39, "with the" should read --with and--;  
Line 40, "function" should read --functions--; and "there is the case where" should be deleted; and  
Line 65, "electron emitting" should read --the electron emitting device--.

COLUMN 11

Line 1, "electron emitting" should read --the electron emitting device--;  
Line 7, "in" should read --on--;  
Line 23, "further" should be deleted;  
Line 43, "1, and then" should read --1. Then--;  
Line 49, "method or a" should read --method, a--;  
Line 53, "these alloy materials" should read --an alloy of these metals--;  
Line 58, "preferably" should read --and preferably--; and  
Line 65, "pm, preferably" should read --µm, and preferably--.

UNITED STATES PATENT AND TRADEMARK OFFICE
CERTIFICATE OF CORRECTION

PATENT NO. : 6,933,664 B2
APPLICATION NO. : 10/464760
DATED : August 23, 2005
INVENTOR(S) : Shin Kitamura et al.

It is certified that error appears in the above-identified patent and that said Letters Patent is hereby corrected as shown below:

COLUMN 12

Line 8, "conductivity" should read --conductivity,--;
Line 9, "2" should read --2,--;
Line 10, "method or" should read --method,--;
Line 17, "these alloy" should read --an alloy of these metals,--;
Line 18, "materials," should be deleted;
Line 23, "preferably" should read --and preferably--;
Line 30, "process" should read --process,--;
Line 37, "method or" should read --method,--;
Line 45, "As the" should read --As to the--; and
Line 66, "preferably" should read --and preferably--;

COLUMN 14

Line 33, "((" should read --(--;
Line 34, "))" should read --),--;
Line 35, "G)" should read --G),--; and
Line 45, "method or" should read --method,--.

COLUMN 15

Line 43, "communicated" should read --, together--;
Line 53, "an" should read --the--; and
Line 54, "emitting electron" should read --emitted electrons--.

COLUMN 17

Line 52, "by" should read --of--;
Line 54, "shown) which is" should read --shown),--;
Line 56, "an" should be deleted; and
Line 66, "a black" should read --black--.

COLUMN 18

Line 5, "like as" should read --like, or as--;
Line 13, "cross sectional" should read --cross-sectional--;
Line 17, "details." should read --detail.--; and
Line 39, "in" should read --on--.

UNITED STATES PATENT AND TRADEMARK OFFICE
CERTIFICATE OF CORRECTION

PATENT NO. : 6,933,664 B2
APPLICATION NO. : 10/464760
DATED : August 23, 2005
INVENTOR(S) : Shin Kitamura et al.

It is certified that error appears in the above-identified patent and that said Letters Patent is hereby corrected as shown below:

COLUMN 19

Line 3, "details." should read --detail.--;
    Line 18, "photolithography" should read --photolithography process--;
    Line 23, "solution" should be deleted; and
    Line 45, "since" should read --and since--.

COLUMN 20

Line 6, "cross sectional" should read --cross-sectional--;
    Line 10, "details." should read --detail.--;
    Line 25, "photolithography" should read --photolithography process--;
    Line 53, "since" should read --and since--;
    Line 62, "that" should read --in which--; and
    Line 66, "cross sectional" should read --cross-sectional--.

COLUMN 21

Line 26, "dielectrics" should read --dielectric--;
    Line 32, "since" should read --and since--;
    Line 38, "that" should read --in which--; and
    Line 44, "cross sectional" should read --cross-sectional--.

COLUMN 22

Line 4, "on" should read --of--;
    Line 22, "on" should read --of--;
    Line 29, "that, in" should read --that--;
    Line 30, "in that" should read --including--;
    Line 32, "2," should read --2 and--;
    Line 36, "cross sectional" should read --cross-sectional--; and
    Line 47, "photolithography" should read --photolithography process--.

UNITED STATES PATENT AND TRADEMARK OFFICE
CERTIFICATE OF CORRECTION

PATENT NO. : 6,933,664 B2
APPLICATION NO. : 10/464760
DATED : August 23, 2005
INVENTOR(S) : Shin Kitamura et al.

It is certified that error appears in the above-identified patent and that said Letters Patent is hereby corrected as shown below:

COLUMN 23

Line 17, "in both" should read --on both--;
    Line 21, "that, in" should read --that--;
    Line 22, "in that" should read --including--;
    Line 24, "2," should read --2 and--;
    Line 31, "constitution" (both occurrences) should be deleted;
    Line 34, "parallel, the" should read --parallel. The--;
    Line 49, "relatively" should read --relative--;
    Line 57, "the above" should read --above--;
    Line 58, "cross sectional" should read --cross-sectional--;
    Line 61, "emitting" should read --emitting device,--;
    Line 62, "thick" should read --to be thick--; and "a" should be deleted;
    Line 64, "a matrix" should read --matrix--; and
    Line 68, "wiring in" should read --wiring on--.

COLUMN 24

Line 2, "in" should read --on--;
    Line 4, "$O_2$gas." should read --$O_2$ gas.--;
    Line 6, "the" should read --an--;
    Line 7, "to a" should read --to the--;
    Line 8, "and" should read --and which--;
    Line 12, "cross sectional" should read --cross-sectional--;
    Line 16, "details" should read --detail--;
    Line 32, "photolithography" should read --photolithography process--; and
    Line 57, "in" should read --on--.

COLUMN 25

Line 10, "that," should read --that--;
    Line 13, "an" should read --the--;
    Line 14, "factor" should be deleted;
    Line 17, "cross sectional" should read --cross-sectional--; and
    Line 34, "photolithography" should read --photolithography process--.

UNITED STATES PATENT AND TRADEMARK OFFICE
CERTIFICATE OF CORRECTION

PATENT NO.        : 6,933,664 B2
APPLICATION NO.   : 10/464760
DATED             : August 23, 2005
INVENTOR(S)       : Shin Kitamura et al.

It is certified that error appears in the above-identified patent and that said Letters Patent is hereby corrected as shown below:

COLUMN 26

Line 38, "thus" should read --thus,--; and "characteristic" should read --characteristics--;
    Line 45, "cross" should read --cross- --;
    Line 49, "emitting is designed thick" should read --emitting device is designed thicker--;
    Line 51, "decrease a" should read --decrease the--;
    Line 58, "a wiring in" should read --wiring on--;
    Line 59, "a wiring in" should read --wiring on--;
    Line 64, "a reduction effect" should read --the reduction--; and
    Line 65, "and" should read --and which--.

COLUMN 27

Line 2, "emitting" should read --emission--.

COLUMN 28

Line 35, Claim 9 "further comprising" should read --further comprising:--.

Signed and Sealed this

Thirty-first Day of March, 2009

JOHN DOLL
*Acting Director of the United States Patent and Trademark Office*